United States Patent
Gu et al.

(10) Patent No.: US 12,199,304 B2
(45) Date of Patent: Jan. 14, 2025

(54) BOX OF BATTERY, BATTERY, POWER CONSUMPTION DEVICE, AND METHOD AND DEVICE FOR PRODUCING BATTERY

(71) Applicant: CONTEMPORARY AMPEREX TECHNOLOGY (HONG KONG) LIMITED, Hong Kong (CN)

(72) Inventors: Mingguang Gu, Ningde (CN); Xiaobo Chen, Ningde (CN); Yao Li, Ningde (CN); Jinru Yue, Ningde (CN); Piaopiao Yang, Ningde (CN); Lu Hu, Ningde (CN); Xianda Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 509 days.

(21) Appl. No.: 17/549,983

(22) Filed: Dec. 14, 2021

(65) Prior Publication Data
US 2022/0302548 A1    Sep. 22, 2022

Related U.S. Application Data

(63) Continuation of application No. PCT/CN2021/082088, filed on Mar. 22, 2021.

(51) Int. Cl.
*H01M 50/333* (2021.01)
*H01M 50/262* (2021.01)

(52) U.S. Cl.
CPC ....... *H01M 50/333* (2021.01); *H01M 50/262* (2021.01); *H01M 2220/20* (2013.01)

(58) Field of Classification Search
None
See application file for complete search history.

(56) References Cited

U.S. PATENT DOCUMENTS 5,004,129 A    4/1991  Loch et al.

FOREIGN PATENT DOCUMENTS

| CN | 102024921 A | 4/2011 |
|---|---|---|
| CN | 104584265 A | 4/2015 |

(Continued)

OTHER PUBLICATIONS

Machine translation CN104835929A (Year: 2015).*

(Continued)

*Primary Examiner* — Victoria H Lynch
(74) *Attorney, Agent, or Firm* — Scully, Scott, Murphy & Presser, P.C.

(57) ABSTRACT

The present application provides a box of a battery, a battery, and a power consumption device. The box includes: a first component, including a first interface; a second component, configured to connect with the first component to form a chamber, the second component including a second interface, the second interface being configured to be arranged opposite to the first interface; a first locking mechanism, configured to lock the first component and the second component, so that the first interface and the second interface are sealed and connected; the first locking mechanism is configured to be actuated when an internal pressure of a chamber exceeds a preset value, so that the first interface and the second interface break away from a sealed state to relieve the internal pressure of the chamber. The pressure relief ability of the battery can be improved, and the safety of the battery can be enhanced.

16 Claims, 15 Drawing Sheets

(56) References Cited

FOREIGN PATENT DOCUMENTS

| | | |
|---|---|---|
| CN | 104835929 | 8/2015 |
| CN | 104835929 A | 8/2015 |
| CN | 204832472 U | 12/2015 |
| CN | 107819086 A | 3/2018 |
| CN | 108110188 A | 6/2018 |
| CN | 208111552 U | 11/2018 |
| CN | 209896148 U | 1/2020 |
| DE | 202014100486 U1 | 5/2015 |
| WO | 2018012224 A1 | 1/2018 |

OTHER PUBLICATIONS

Machine translation CN204832472U (Year: 2015).*
Extended European Search Report dated May 30, 2022 received in European Patent Application No. EP 21754879.1.
Notification of Registration and Grant of Patent for Invention dated Sep. 24, 2023 received in Chinese Patent Application No. CN 202180000832.1.

* cited by examiner

BOX OF BATTERY, BATTERY, POWER CONSUMPTION DEVICE, AND METHOD AND DEVICE FOR PRODUCING BATTERY

CROSS-REFERENCE TO RELATED APPLICATIONS

This application is a continuation of International Application No. PCT/CN2021/082088, filed on Mar. 22, 2021, the disclosure of which is hereby incorporated by reference in its entirety.

TECHNICAL FIELD

The present application relates to the technical field of batteries, and in particular, to a box of a battery, a battery, a power consumption device, and a method and device for producing a battery.

BACKGROUND

Energy saving and emissions reduction are the key to the sustainable development of the automotive industry. In this case, electric vehicles have become an important part of the sustainable development of the automotive industry due to their advantages in energy conservation and environmental protection. For the electric vehicles, the battery technology is an important factor related to their development.

In the development of the battery technology, in addition to improving the performance of batteries, safety is also an issue that cannot be ignored. Excessive internal pressure of the battery will bring serious safety risks.

Therefore, how to improve the pressure relief ability of the batteries and enhance the safety of the batteries is an urgent technical problem to be solved in the battery technology.

SUMMARY

Embodiments of the present application provide a box of a battery, a battery, a power consumption device, and a method and device for producing a battery, such that the pressure relief ability of the battery may be improved, and the safety of the battery may be enhanced.

In a first aspect, a box of a battery is provided, including: a first component, including a first interface; a second component, configured to connect with the first component to form a chamber, the second component including a second interface, the second interface being configured to be arranged opposite to the first interface; a first locking mechanism, configured to lock the first component and the second component, so that the first interface and the second interface are sealed and connected; wherein, the first locking mechanism is configured to be actuated when an internal pressure of the chamber exceeds a preset value, so that the first interface and the second interface break away from a sealed state to relieve the internal pressure of the chamber.

In the technical solution of the embodiment of the present application, the first locking mechanism is used to lock the first component and the second component of the box, so as to seal and connect the first interface and the second interface. When the internal pressure of the box of the battery exceeds the preset value, the first locking mechanism is actuated so that the first interface and the second interface break away from the sealed state, and thus the internal pressure of the box may be relieved through the sealing interface on the box. The technical solution of the present application may meet normal sealing requirements, and the pressure may also be relieved through the sealing interface when the internal pressure of the box increases. Compared with a pressure relief mechanism arranged on the box of the battery that needs to be restrained by an installation space that may be reserved on the box of the battery, the first locking mechanism is simple in structure, and may achieve a larger pressure relief area on the sealing interface without occupying an additional installation space, in addition, the pressure relief from interface is fast, and high in pressure relief efficiency, and thus the pressure relief ability of the battery may be improved, the safety risks are reduced, and the safety of the battery may be enhanced.

The first locking mechanism provided by the embodiment of the present application is configured to lock the first component and the second component without occupying an additional installation space on the box of the battery, and may work together with the pressure relief mechanism arranged on the box to increase an pressure relief area and improve the pressure relief ability; it may also provide a good pressure relief solution when the space reserved for installing the pressure relief mechanism on the box of the battery is too small to install the pressure relief mechanism; and the structure is simple and the pressure relief efficiency is high.

In some embodiments, the first locking mechanism includes an elastic element, and the elastic element is configured to generate elastic deformation when the internal pressure of the chamber exceeds the preset value, so that the first interface and the second interface break away from the sealed state.

The elastic element has sufficient deformability and may open sufficient exhaustion spaces to better relieve the pressure when the pressure is relieved and exhaust.

In some embodiments, the first locking mechanism further includes a supporting member, one end of the elastic element is configured to abut against one of the first component and the second component, and the other end of the elastic element is configured to abut against the supporting member, to allow the first component or the second component to move relative to the supporting member, when the internal pressure of the chamber exceeds the preset value.

The first locking mechanism uses the elastic element and the supporting member to cooperate to seal and connect the first interface and the second interface; and the first component or the second component may move relative to the supporting member under the internal pressure of the box, and compress the elastic element, so that the first interface and the second interface break away from the sealed state for pressure relief, when the internal pressure of the box of the battery exceeds the preset value. The arrangement of the supporting member facilitates the elastic deformation of the elastic element to work, and the first locking mechanism formed thereby is simple in structure, and requires a smaller installation space.

In some embodiments, the first locking mechanism further includes a connecting rod, and one end of the connecting rod is configured to be attached to a same component with the elastic element; the supporting member is provided with a guide hole, and the other end of the connecting rod is configured to pass through the guide hole, so that the connecting rod moves along an extending direction of the guide hole, when the elastic element is elastically deformed.

The cooperation of the connecting rod and the guide hole restricts a deformation direction of the elastic element, and may guide the elastic element to deform in a direction in which the first interface and the second interface are away from each other or approaching each other.

In some embodiments, one end of the supporting member is configured to abut against the elastic element, and the other end of the supporting member is configured to be attached to the other one of the first component and the second component.

The elastic element abuts against one of the first component or the second component, one end of the supporting member abuts against the elastic element, and the other end of the supporting member is attached to the other one of the first component or the second component. In this way, the supporting member may be fixed on the first component or the second component, that is, may be used as a portion of the box of the battery, and there is no need to additionally provide a position for fixing the supporting member on a component other than the box of the battery.

In some embodiments, the first component is provided with a first through hole; the first locking mechanism further includes: a connecting rod, one end of the connecting rod is configured to be attached to the second component, and the other end of the connecting rod is configured to pass through the first through hole to be attached to the supporting member; one end of the elastic element is configured to abut against the first component, and the other end of the elastic element is configured to abut against the supporting member.

The first through hole is arranged on the first component for the connecting rod passing through, and the cooperation of the connecting rod and the first through hole may provide a positioning function when the first component and the second component are locked, and facilitate disassembly.

In some embodiments, the second component is provided with a second through hole, and the connecting rod is configured to pass through the first through hole and the second through hole, to connect the first component and the second component.

Both the first component and the second component may be provided with a through hole, which is for the connecting rod passing through, and the connecting rod may be disassembled from the first component and the second component, and facilitate disassembly.

In some embodiments, the supporting member includes a first supporting member and a second supporting member; one end of the connecting rod is configured to be attached to the first supporting member, the other end of the connecting rod is configured to be attached to the second supporting member, and the second supporting member is configured to abut against the second component; one end of the elastic element is configured to abut against the first component, and the other end of the elastic element is configured to abut against the first supporting member.

In some embodiments, the supporting member includes a first supporting member and a second supporting member; the elastic element includes a first elastic element and a second elastic element; wherein, one end of the connecting rod is configured to be attached to the first supporting member, and the other end of the connecting rod is configured to be attached to the second supporting member; one end of the first elastic element is configured to abut against the first component, and the other end of the first elastic element is configured to abut against the first supporting member; one end of the second elastic element is configured to abut against the second component, and the other end of the second elastic element is configured to abut against the second supporting member.

The first component and the second component are both abutted against elastic elements, and the maximum gap that may be separated between the first component and the second component is the sum of a deformation amount of the first elastic element and a deformation amount of the second elastic element, which may increase the pressure relief area.

In some embodiments, the elastic element is configured to be sleeved on the connecting rod.

The elastic element is sleeved on the connecting rod, and the connecting rod may guide the deformation (for example, compression or stretching) of the elastic element.

In some embodiments, the first locking mechanism further includes a first abutment member, the elastic element abuts against the first component through the first abutment member, wherein an area where the first abutment member contacts with the first component is larger than an area where the first abutment member contacts with the elastic element; and/or, the first locking mechanism further includes a second abutment member, and the elastic element abuts against the second component through the second abutment member, wherein an area where the second abutment member contacts with the second component is larger than an area where the second abutment member contacts with the elastic element.

The elastic element abuts against the first component or the second component through the abutment member (for example, the first abutment member or the second abutment member), and a force of the elastic element may be indirectly transmitted to other components through the abutment member. An area where the abutment member contacts with other components (for example, the first component or the second component) is larger than an area where the elastic element contacts with the abutment member, thereby alleviating the problem of stress concentration on the other components.

In some embodiments, at least one abutment surface for abutting against the elastic element is provided with a restraint part, and the restraint part is configured to restrain movement of the elastic element perpendicular to an elasticity direction of the elastic element.

The restraint part may cooperate with the elastic element to position the elastic element.

In some embodiments, the restraint part includes a recess, and the recess is configured to house an end of the elastic element corresponding to the restraint part.

A side wall of the recess at least may limit an outer surface of the end of the elastic element, thereby providing a positioning function, and the bottom wall of the recess may provide a locking surface to abut against the elastic element.

In some embodiments, the restraint part includes a protrusion, wherein an end of the elastic element corresponding to the restraint part is sleeved on the protrusion.

A side wall of the protrusion may limit an inner side of the end of the elastic element, thereby providing a positioning function.

In some embodiments, the connecting rod and the supporting member are of a detachable connection.

The connecting rod and the supporting member are of a detachable connection, which facilitates disassembly, assembly and maintenance.

In some embodiments, the box further includes a sealing member, and the sealing member is arranged between the first component and the second component, so that the first interface and the second interface are sealed and connected.

Between the first interface and the second interface, sealing and connection may be achieved through the sealing member, and the sealing performance of the sealing interface may be improved.

In some embodiments, one end of the elastic element is configured to be attached to the first component, the other end of the elastic element is configured to be attached to the second component, and the elastic element is configured to be always in a stretched state when the first interface and the second interface maintain in the sealed state and break away from the sealed state.

An elastic force generated when the elastic element is stretched is used to lock the first component and the second component, and allow the first interface and the second interface to break away from the sealed state. Since the elastic element is always in a stretched state, the deformation direction of the elastic element is relatively fixed, and there is almost no bending deformation or torsion deformation. Therefore, there is no need to provide a connecting rod to guide the deformation direction.

In some embodiments, the first component includes a third interface; the second component includes a fourth interface, and the fourth interface is configured to be arranged opposite to the third interface; the box further includes: a second locking mechanism, configured to lock the first component and the second component, so that the third interface and the fourth interface are sealed and connected; wherein the third interface and the fourth interface maintain in a sealed state, when the internal pressure of the chamber exceeds the preset value, so that the internal pressure of the chamber is relieved through a gap between the first interface and the second interface that break away from the sealed state.

When the first locking mechanism and the second locking mechanism lock the first component and the second component, the first interface and the second interface are in the sealed state, and the third interface and the fourth interface are in the sealed state. When the internal pressure of the chamber exceeds the preset value, the third interface and the fourth interface maintain in the sealed state, and the first locking mechanism is actuated to make the first interface and the second interface break away from the sealed state. In this way, the internal pressure of the chamber may be relieved through the gap formed after the first interface and the second interface break away from the sealed state, thereby reducing the safety risks caused by the increase in the internal pressure of the chamber, and achieving directional pressure relief.

In the case of thermal runaway occurring in a battery cell, the directional pressure relief may reduce airflow exchanges in and out of the chamber, so that the emissions from the battery cell in the chamber always flow from the inside of the chamber to the outside, reducing or avoiding the entry of outside air, such as oxygen, into the chamber, so as to avoid further safety problems.

In some embodiments, a first preload applied by the first locking mechanism on the first component or the second component is smaller than a second preload applied by the second locking mechanism on the first component or the second component.

By setting the preloads of the first locking mechanism and the second locking mechanism, the internal pressure of the chamber may be discharged through a position with a smaller preload, thereby achieving directional pressure relief.

In some embodiments, the first locking mechanism is further configured to recover the first interface and the second interface to the sealed state, when the internal pressure of the chamber is relieved to smaller than or equal to the preset value.

The first interface and the second interface break away from the sealed state for pressure relief, when the internal pressure of the chamber is excessively high. After the pressure is relieved, the sealed state may be recovered to seal the chamber. The battery inside the chamber may continue to work in a sealed environment, to support a device that uses the battery to continue to operate. Taking an electric vehicle as an example, if the battery cell explodes, the emissions from the battery cell, such as, high-pressure gases generated by the explosion, may be discharged through the gap between the first interface and the second interface, to relieve the internal pressure of the chamber. When the pressure is relieved below the preset value, the first interface and the second interface are recovered to the sealed state, and other unexploded battery cells may continue to work in the sealed environment, to extend the driving time of the electric vehicle and allow the driver to park the car to the side of the road or drive to a garage, to reduce the potential safety hazards caused by battery failure.

In some embodiments, the box includes a plurality of the first locking mechanisms, and a spacing between the plurality of the first locking mechanisms includes a first spacing and a second spacing, wherein the first spacing is greater than the second spacing, so as to allow a portion corresponding to the first spacing on the first interface and the second interface to break away from the sealed state for pressure relief, when the internal pressure of the chamber exceeds the preset value.

By setting the spacing between the first locking mechanisms, the internal pressure of the chamber may be discharged through a position with a larger spacing, thereby achieving directional pressure relief.

In some embodiments, the box includes a first portion, a second portion and an isolation component; the first portion and the second portion are formed with an accommodating space, and the accommodating space includes an electrical chamber and a collection chamber separated by the isolation component; wherein, the electrical chamber is configured to accommodate a plurality of battery cells, at least one battery cell of the plurality of battery cells includes a pressure relief mechanism, and the pressure relief mechanism is configured to be actuated to relieve an internal pressure, when the internal pressure or temperature of the battery cell provided with the pressure relief mechanism reaches a threshold; the collection chamber is configured to collect emissions from the battery cell provided with the pressure relief mechanism when the pressure relief mechanism is actuated; the first component and the second component are any two of the first portion, the second portion and the isolation component.

In a second aspect, a battery is provided, including: a plurality of battery cells; and the box in the first aspect, and the box is configured to accommodate the plurality of battery cells.

In a third aspect, a power consumption device is provided, including: the battery in the second aspect.

In some embodiments, the power consumption device is a vehicle, a ship or a spacecraft.

In a fourth aspect, a method for producing a battery is provided; including: providing a plurality of battery cells; providing a box, the box configured to accommodate the plurality of battery cells, the box including: a first component, including a first interface; a second component, including a second interface, the second interface being configured to be arranged opposite to the first interface; a first locking mechanism, configured to lock the first component and the second component; locking, by the first locking mechanism, the first component and the second component, so that the first interface and the second interface are sealed and connected to form a chamber, wherein the first locking mechanism is actuated when an internal pressure of the chamber exceeds a preset value, so that the first interface and the second interface break away from a sealed state to relieve the internal pressure of the chamber.

In a fifth aspect, a device for producing a battery is provided, including modules for executing the method provided in the above fourth aspect.

BRIEF DESCRIPTION OF THE DRAWINGS

In order to illustrate the technical solution in the embodiments of the present application more clearly, brief description will be made below to the drawings required in the embodiments of the present application, and apparently, the drawings described below are some embodiments of the present application only, and other drawings could be obtained based on these drawings by those ordinary skilled in this art without creative efforts.

Figure 1:
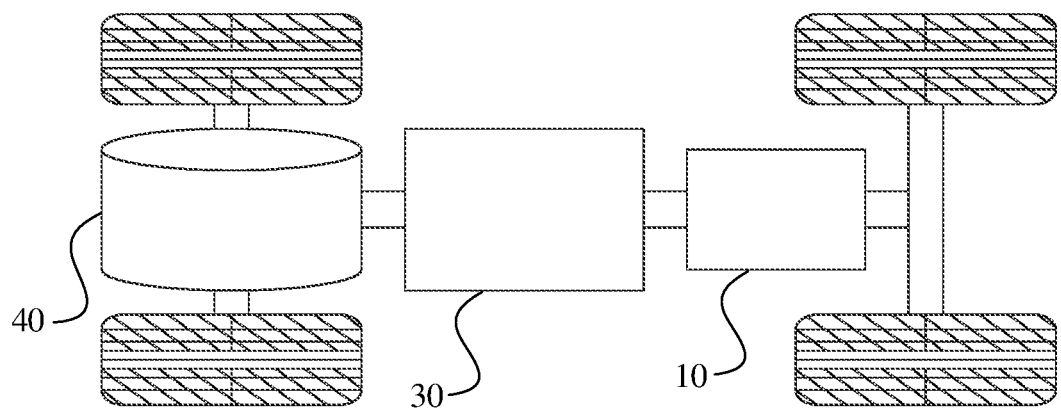
FIG. 1 is a schematic structural diagram of a vehicle according to an embodiment of the present application.

In the drawings, the drawings are not drawn to actual scale.

DESCRIPTION OF REFERENCE SIGNS

1—vehicle; 10—battery; 11—box; 11a—electrical chamber; 11b—collection chamber; 111—first component; 1111—first through hole; 1112—first sub-portion; 1113—second sub-portion; 1101—first interface; 112—second component; 1121—second through hole; 1102—second interface; 1103—chamber; 113—first locking mechanism; 1131—elastic element; 1131a—first end; 1131b—second end; 11311—first elastic element; 11312—second elastic element; 1132—supporting member; 1132a—third end; 1132b—fourth end; 11321—first supporting member; 11322—second supporting member; 1133—connecting rod; 11331—first connecting rod; 11332—second connecting rod; 1134—guide hole; 1137—abutment member; 11371—first abutment member; 11372—second abutment member; 1138—restraint part; 11381—recess; 11382—protrusion; 114—sealing member; 1104—third interface; 1105—fourth interface; 1106—gap; 115—second locking mechanism; 1151—screw; 1152—nut; 1153—nut; 116—first locking mechanism; 12—first portion; 13—second portion; 14—isolation component; 20—battery cell; 21—battery box; 21a—first wall; 211—housing; 212—cover plate; 213—pressure relief mechanism; 214—electrode terminal; 214a—positive electrode terminal; 214b—negative electrode terminal; 22—electrode assembly; 221a—first electrode tab; 222a—second electrode tab; 23—connection member; 24—backing plate; 25—bus component; 30—controller; 40—motor.

DESCRIPTION OF EMBODIMENTS

Implementations of the present application will be further described below in detail with reference to the drawings and embodiments. The detailed description and drawings of the following embodiments are configured to exemplarily illustrate the principle of the present application, but cannot be configured to limit the scope of the present application, that is, the present application is not limited to the described embodiments.

Unless otherwise defined, all technical and scientific terms used in the present application have a same meaning as those commonly understood by those skilled in the art to which the present application pertains. The terms used in the specification of the present application are merely for the purpose of describing specific embodiments, and are not intended to limit the present application. The terms "including" and "having" and any variations thereof in the specification and claims of the present application as well as the above description of the drawings are intended to cover non-exclusive inclusions.

In the description of the present application, it should be noted that unless otherwise stated, the meaning of "a plurality of" is two or more; orientations or positional relationships indicated by terms, such as "up", "down", "left", "right", "inside", "outside", etc., are merely for convenience of describing the present application and for simplifying the description, not for indicating or implying that an indicated device or element must have a specific orientation, and must be constructed and operated in a specific orientation, which thus may not be understood as limiting the present application. In addition, the terms "first", "second" and "third" are only intended for a purpose of description, and shall not be understood as an indication or implication of relative importance. "Vertical" is not strictly vertical, but within the allowable range of error. "Parallel" is not strictly parallel, but within the allowable range of error.

The orientation words appearing in the description below are all directions shown in the figures, and do not limit the specific structure of the application. In the description of the present application, it should be noted that unless otherwise explicitly specified and limited, the terms "mounting", "connecting" and "connection" should be understood in a broad sense, for example, they may be a fixed connection, a detachable connection, or an integrated connection; and may be a direct connection and may also be an indirect connection via an intermediate medium. Those of ordinary skill in the art may appreciate the specific meanings of the above terms in the present application according to specific conditions.

The phrase "embodiments" referred to in the present application means that the descriptions of specific features, structures, and characteristics in combination with the embodiments are included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the present application, the term "and/or" is only an association relation describing associated objects, which means that there may be three relations, for example, A and/or B may represent three situations: A exists alone, both A and B exist, and B exists alone. In addition, the character "/" in the present application generally indicates that the associated objects before and after the character are in an "or" relation.

In the present application, "a plurality of" means two or more (including two), similarly, "a plurality of groups" means two or more groups (including two groups), and "a plurality of sheets" means two or more sheets (including two sheets).

In the present application, battery cells may include lithium-ion secondary batteries, lithium-ion primary batteries, lithium-sulfur batteries, sodium/lithium-ion batteries, sodium-ion batteries or magnesium-ion batteries, etc., which are not limited by the embodiments of the present application. The battery cells may be cylindrical, flat, cuboid or in another shape, which is not limited by the embodiments of the present application. The battery cells are generally divided into three types according to the way of packaging: cylindrical battery cells, prismatic battery cells and pouch battery cells, which are not limited by the embodiments of the present application.

The battery mentioned in the embodiment of the present application refers to a single physical module that includes one or more battery cells to provide a higher voltage and capacity. For example, the battery mentioned in the present application may include a battery module or a battery pack, etc. The battery generally includes a box for enclosing one or more battery cells. The box may prevent liquid or other foreign matters from affecting the charging or discharging of the battery cell.

The battery cell includes an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet. The positive electrode sheet includes a positive electrode current collector and a positive active material layer. The positive active material layer is coated on a surface of the positive electrode current collector, and the positive current collector not coated with the positive active material layer protrudes from the positive current collector coated with the positive active material layer and is used as a positive electrode tab. Taking a lithium-ion battery as an example, the material of the positive electrode current collector may be aluminum, and the positive electrode active material may be lithium cobalt oxides, lithium iron phosphate, ternary lithium or lithium manganate, etc. The negative electrode sheet includes a negative electrode current collector and a negative active material layer. The negative active material layer is coated on a surface of the negative electrode current collector, and the negative current collector not coated with the negative active material layer protrudes from the negative current collector coated with the negative active material layer and is used as a negative electrode tab. The material of the negative electrode current collector may be copper, and the negative electrode active material may be carbon or silicon, etc. In order to ensure that no fusing occurs when a large current passes, there are a plurality of positive electrode tabs which are stacked together, and there are a plurality of negative electrode tabs which are stacked together. A material of the isolation film may be polypropylene (polypropylene, PP) or polyethylene (polyethylene, PE), etc. In addition, the electrode assembly may have a coiled structure or a laminated structure, and the embodiments of the present application are not limited thereto.

With the development of the battery technology, it is necessary to consider many design factors, such as energy density, cycle life, discharge capacity, C-rate and other performance parameters. In addition, the safety of the battery should also be considered.

With respect to battery cells, the main safety hazards come from the charging and discharging processes, and a suitable environmental temperature design is also required. In order to effectively avoid unnecessary losses, at least triple protection measures are generally taken for the battery cells. Specifically, the protection measures include at least a switching element, a properly selected isolation film material and a pressure relief mechanism. The switching element refers to an element that may stop the charging or discharging of a battery when the temperature or resistance in a battery cell reaches a certain threshold. The isolation film is configured to isolate the positive electrode sheet from the negative electrode sheet and may automatically dissolve micron-sized (or even nanoscale) micropores attached to the isolation film when the temperature rises to a certain value, thus preventing metal ions from passing through the isolation film and terminating the internal reaction of the battery cell.

The pressure relief mechanism arranged on the battery cell refers to an element or component that is actuated to relieve an internal pressure or heat when the internal pressure or temperature of the battery cell reaches a predetermined threshold. The threshold design is different according to different design requirements. The threshold may depend on the material of one or more of the positive electrode sheet, the negative electrode sheet, the electrolytic solution and the isolation film in the battery cell. The pressure relief mechanism arranged on the battery cell may adopt the form of an anti-explosion valve, an air valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism performs an action or a weakened structure arranged in the pressure relief mechanism is damaged, so as to form an opening or channel for relieving the internal pressure or heat.

The pressure relief mechanism arranged on the box of the battery refers to an element or component that is actuated to relieve an internal pressure or heat of the box of the battery when the internal pressure or temperature of the box of the battery reaches a predetermined threshold. The pressure relief mechanism arranged on the box of the battery may adopt the form of an anti-explosion valve, an air valve, a pressure relief valve or a safety valve, etc., and may specifically adopt a pressure-sensitive or temperature-sensitive element or structure. That is, when the internal pressure or temperature of the box of the battery reaches a predetermined threshold, the pressure relief mechanism performs an action or a weakened structure arranged in the pressure relief mechanism is damaged, so as to form an opening or channel for relieving the internal pressure or heat of the box of the battery.

The "actuation" mentioned in the present application means that the pressure relief mechanism acts or is activated to a certain state, such that the internal pressure and heat of the battery cell may be relieved. The action generated by the pressure relief mechanism may include but be not limited to: at least a portion of the pressure relief mechanism being fractured, broken, torn or opened, and so on. When the pressure relief mechanism is actuated, high-temperature and high-pressure substances inside the battery cell are discharged outwards from an actuated position as emissions. In this way, the pressure in the battery cell may be relieved at a controllable pressure or temperature, thereby avoiding potentially more serious accidents.

The emissions from the battery cell mentioned in the present application include but are not limited to: the electrolytic solution, the dissolved or split positive and negative electrode sheets, fragments of the isolation film, high-temperature and high-pressure gas generated by reaction, flame, etc.

The pressure relief mechanism on the battery cell has an important impact on the safety of the battery. For example, when short circuit, overcharge and other phenomena occur, it may lead to thermal runaway inside the battery cell, resulting in a sudden increase in pressure or temperature. In this case, the internal pressure and heat may be released outward through the actuation of the pressure relief mechanism, to prevent the battery cell from exploding and catching fire.

After the pressure relief mechanism is actuated, emissions from the battery cells accumulate in the box of the battery. In the current pressure relief solution, the emissions inside the box need to be performed pressure relief by the pressure relief mechanism arranged on the box of the battery. The discharge path is longer, and the space available for installing the pressure relief mechanism on the box of the battery is limited, resulting in a small pressure relief area, and a low pressure relief efficiency, which in turn leads to the weaker pressure relief ability of the battery. The emissions from the battery cells cannot be discharged from the box of the battery in time, which will cause further safety problems.

In view of this, the present application provides a technical solution that a first locking mechanism is used to lock a first component and a second component of the box, so as to seal and connect a first interface on the first component and a second interface on the second component. The first locking mechanism is actuated so that the first interface and the second interface break away from the sealed state, when the internal pressure of the box of the battery exceeds the preset value, and thus the internal pressure of the box may be relieved through the sealing interface on the box. The first locking mechanism locks the first interface and the second interface, which may not only meet normal sealing requirement, but also may be actuated when the internal pressure of the box increases, to relieve the pressure through the sealing interface. The first locking mechanism is simple in structure, does not need to occupy an additional installation space on the box of the battery, and may achieve a larger pressure relief area on the sealing interface; and the pressure relief from interface is fast, thus improving the exhaustion efficiency and the pressure relief ability of the battery, thereby reducing the safety risks and enhancing the safety of the battery.

The thermal management component mentioned in the present application is configured to accommodate a fluid to adjust a temperature of a plurality of battery cells. The fluid here may be liquid or gas, and temperature adjustment means heating or cooling the plurality of battery cells. In the case of cooling or lowering the temperature of the battery cells, the thermal management component is configured to accommodate a cooling fluid to lower the temperature of the plurality of battery cells. In this case, the thermal management component may also be called a cooling component, a cooling system or a cooling plate, etc. The fluid accommodated by the thermal management component may also be called a cooling medium or a cooling fluid, and more specifically, may be called a cooling liquid or a cooling gas. In addition, the thermal management component may also be used for heating to raise the temperature of the plurality of battery cells, which is not limited by the embodiments of the present application. In some embodiments, the fluid may flow in a circulating manner to achieve better temperature adjustment effects. In some embodiments, the fluid may be water, a mixture of water and ethylene glycol, or air, etc.

The electrical chamber mentioned in the present application is configured to accommodate multiple battery cells and a bus component. The electrical chamber may be sealed or unsealed. The electrical chamber provides an installation space for the battery cells and the bus component. In some embodiments, a structure configured to fix the battery cells may also be arranged in the electrical chamber. The shape of the electrical chamber may be determined according to the plurality of battery cells and the bus component which are accommodated therein. In some embodiments, the electrical chamber may be a cube with six walls. Since the battery cells in the electrical chamber form higher voltage output through electrical connection, the electrical chamber may also be called a "high-voltage chamber".

The bus component mentioned in the present application is configured to implement the electrical connection between the plurality of battery cells, such as parallel connection, series connection or series-parallel connection. The bus component may implement the electrical connection between the battery cells by connecting electrode terminals of the battery cells. In some embodiments, the bus component may be fixed to the electrode terminals of the battery cells by means of welding. Corresponding to the "high-voltage chamber", the electrical connection formed by the bus component may also be called "high-voltage connection".

The collection chamber mentioned in the present application is configured to collect the emissions and may be sealed or non-sealed. In some embodiments, the collection chamber may contain air or another gas. In the collection chamber there is no electrical connection to the voltage output. Corresponding to the "high-voltage chamber", the collection chamber may also be called a "low-voltage chamber". In some embodiments, or additionally, the collection chamber may also contain liquid, such as a cooling medium, or a component for accommodating the liquid is provided to further cool the emissions entering the collection chamber. In some embodiments, the gas or liquid in the collection chamber flows in a circulating manner.

The locking mechanism mentioned in the present application is configured to connect two components of a device, that is, to lock or to screw. The locking manner of the locking mechanism includes bolt locking, rivet locking, clamping locking, magnetic locking, spring locking, etc., so that the two components locked by the locking mechanism are relatively fixed, or may move relatively in a certain space.

The technical solutions described in the embodiments of the present application are all applicable to various devices using batteries, such as mobile phones, portable devices, notebook computers, electromobiles, electronic toys, electric tools, electric vehicles, ships and spacecrafts. For example, the spacecrafts include airplanes, rockets, space shuttles, spaceships, etc.

It should be understood that the technical solutions described in the embodiments of the present application are not only applicable to the above devices, but also applicable to all devices using batteries. However, for the sake of brevity, the following embodiments take electric vehicles as an example for description. In addition, it should be noted that the following is a description of structures of the embodiments with reference to FIG. 1 to FIG. 35. For clarity and conciseness, some embodiments refer to the reference signs in the previous drawings, but not all of them are marked in the part of the drawings corresponding to the embodiments.

For example, as shown in FIG. 1, it is a schematic structural diagram of a vehicle 1 according to an embodiment of the present application. The vehicle 1 may be a fuel vehicle, a gas vehicle or a new-energy vehicle. The new-energy vehicle may be a battery electric vehicle, a hybrid vehicle or an extended-range vehicle, or the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 may be used as an operation power supply of the vehicle 1 and is used for a circuit system of the vehicle 1, for example, for a working power demand of the vehicle 1 during startup, navigation and running. In another embodiment of the present application, the battery 10 may be used not only as an operation power supply of the vehicle 1, but also as a driving power supply of the vehicle 1, replacing or partially replacing fuel or natural gas to provide driving power for the vehicle 1.

In order to meet different power requirements, the battery may include a plurality of battery cells, where the plurality of battery cells may be in series connection, parallel connection or series-parallel connection. The series-parallel connection refers to a combination of series connection and parallel connection. The battery may also be called a battery pack. In some embodiments, the plurality of battery cells may first be connected in series or in parallel or in series and parallel to form battery modules, and then a plurality of battery modules are connected in series or in parallel or in series and parallel to form a battery. That is, a plurality of battery cells may directly form a battery, or may first form battery modules, and then the battery modules form a battery.

Figure 2:
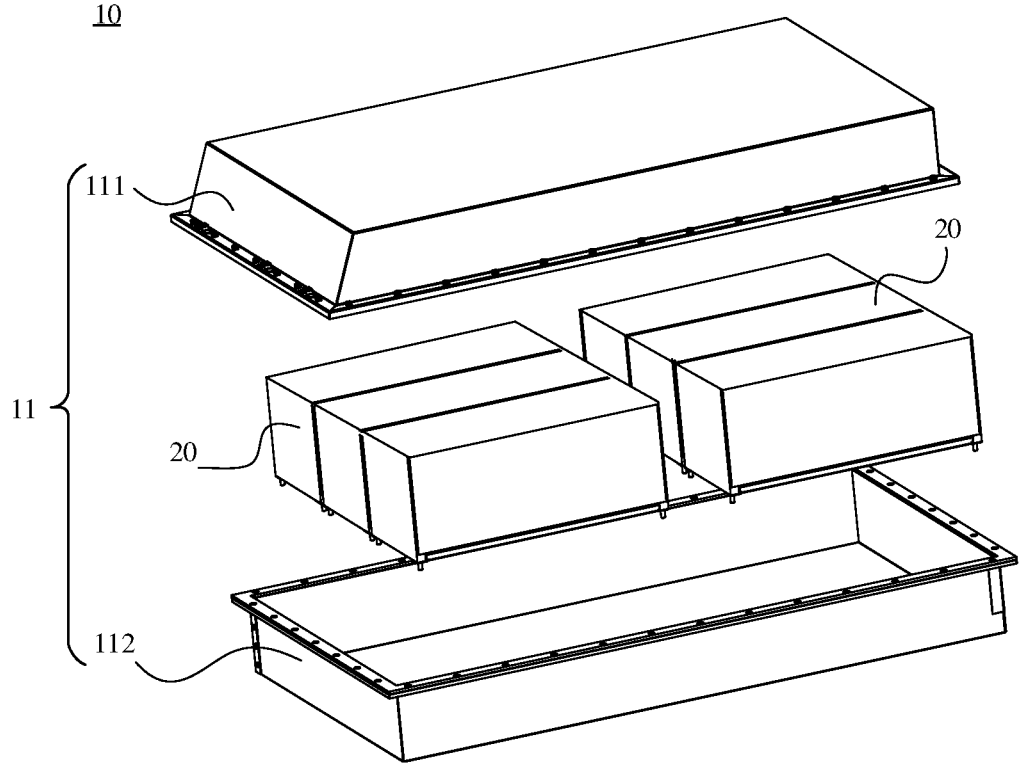
FIG. 2 is an exploded schematic structural diagram of a battery according to an embodiment of the present application.

For example, as shown in FIG. 2, it is an exploded schematic structural diagram of a battery 10 according to an embodiment of the present application. The battery 10 may include a plurality of battery cells 20. The battery 10 may further include a box (or a covering) 11 with the interior thereof being a hollow structure, and the plurality of battery cells 20 are accommodated in the box 11. Exemplarily, referring to FIG. 2, the box 11 may include a first component 111 and a second component 112, and the first component 111 and the second component 112 are fastened together, to form a housing space accommodating a plurality of battery cells 20. The shapes of the first component 111 and the second component 112 may be determined according to the shape of the combined plurality of battery cells 20, and the first component 111 and the second component 112 may each include an opening. For example, the first component 111 and the second component 112 may each be a hollow cuboid and each includes only one surface with an opening, and the opening of the first component 111 is arranged opposite to the opening of the second component 112. The first component 111 and the second component 112 are fastened to each other to form a box with a closed chamber. The plurality of battery cells 20 are combined in parallel connection or series connection or series-parallel connection, and are then placed in the box formed by fastening the first component 111 to the second component 112.

In some embodiments, the battery 10 may further include other structures, which will not be described in detail herein. For example, the battery 10 may also include a bus component. The bus component is configured to implement the electrical connection between the plurality of battery cells 20, such as parallel connection, series connection or series-parallel connection. Specifically, the bus component may implement the electrical connection between the battery cells 20 by connecting electrode terminals of the battery cells 20. In some embodiments, the bus component may be fixed to the electrode terminal of the battery cell 20 by means of welding. Electric energy of the plurality of battery cells 20 may be further led out through an electrically conductive mechanism passing through the box 11. In some embodiments, the electrically conductive mechanism may also belong to the bus component.

According to different power requirements, the number of the battery cells 20 may be set as any value. The plurality of battery cells 20 may be connected in series or in parallel or in series and parallel to implement larger capacity or power. Since there may be many battery cells 20 included in each battery 10, the battery cells 20 may be arranged in groups for convenience of installation, and each group of battery cells 20 constitutes a battery module. The number of the battery cells 20 included in the battery module is not limited and may be set as required.

Figure 3:
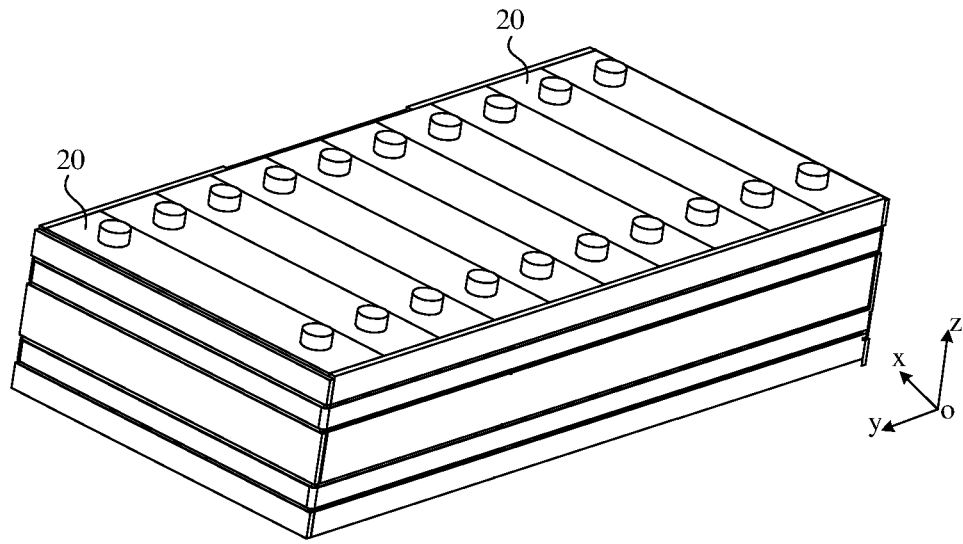
FIG. 3 is a schematic partial structural diagram of a battery module according to an embodiment of the present application.

For example, as shown in FIG. 3, it is a schematic partial structural diagram of a battery module according to an embodiment of the present application. The battery module includes a plurality of battery cells 20, and the plurality of battery cells 20 may be connected in series or in parallel or in series and parallel. It should be understood that FIG. 3 is only an example of the battery module. The battery may include a plurality of battery modules, and these battery modules may be connected in series or in parallel or in series and parallel.

Figure 4:
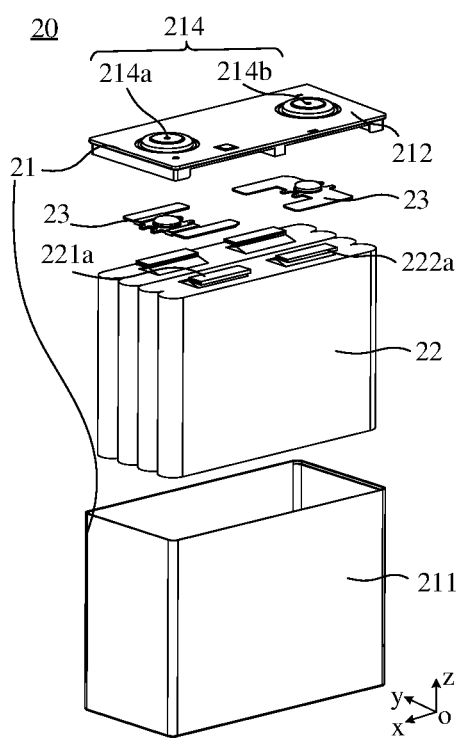
FIG. 4 is a schematic structural diagram of a battery cell according to an embodiment of the present application.

As shown in FIG. 4, it is a schematic structural diagram of a battery cell 20 according to an embodiment of the present application. The battery cell 20 includes a battery box 21 and one or more electrode assemblies 22 housed in the battery box 21. The coordinate system shown in FIG. 4 is the same as that in FIG. 3. In some embodiments, the battery box 21 may also be referred to as a shell.

Referring to FIG. 4, the battery box 21 includes a housing 211 and a cover plate 212. A wall of the housing 211 and the cover plate 212 are both referred to as a wall of the battery cell 20. The housing 211 is shaped according to the shape of the one or more electrode assemblies 22 after combination. For example, the housing 211 may be a hollow cuboid or cube or cylinder, and one surface of the housing 211 includes an opening such that the one or more electrode assemblies 22 may be placed in the housing 211. For example, when the housing 211 is a hollow cuboid or cube, one plane of the housing 211 is an opening surface, i.e., the plane does not include a wall, so that the inside and outside of the housing 211 are in communication with each other. When the housing 211 is a hollow cylinder, an end face of the housing 211 is an opening surface, i.e., the end face does not include a wall, so that the inside and outside of the housing 211 are in communication with each other. The cover plate 212 covers the opening and is connected with the housing 211 to form a closed chamber in which the electrode assembly 22 is placed. The housing 211 is filled with an electrolyte, such as an electrolytic solution.

The battery cell 20 may further include two electrode terminals 214, and the two electrode terminals 214 may be arranged on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connection member 23 also called a current collecting member 23, which is located between the cover plate 212 and the electrode assembly 22 and configured to electrically connect the electrode assembly 22 to the electrode terminal 214.

As shown in FIG. 4, each electrode assembly 22 includes a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. The first electrode tab 221a of the one or more electrode assemblies 22 is connected to one electrode terminal through one connection member 23, and the second electrode tab 222a of the one or more electrode assemblies 22 is connected to the other electrode terminal through the other connection member 23. For example, the positive electrode terminal 214a is connected to the positive electrode tab through one connection member 23, and the negative electrode terminal 214b is connected to the negative electrode tab through the other connection member 23.

In the battery cell 20, according to actual usage requirements, there may be a single or a plurality of electrode assemblies 22. As shown in FIG. 4, there are four separate electrode assemblies 22 in the battery cell 20.

Figure 5:
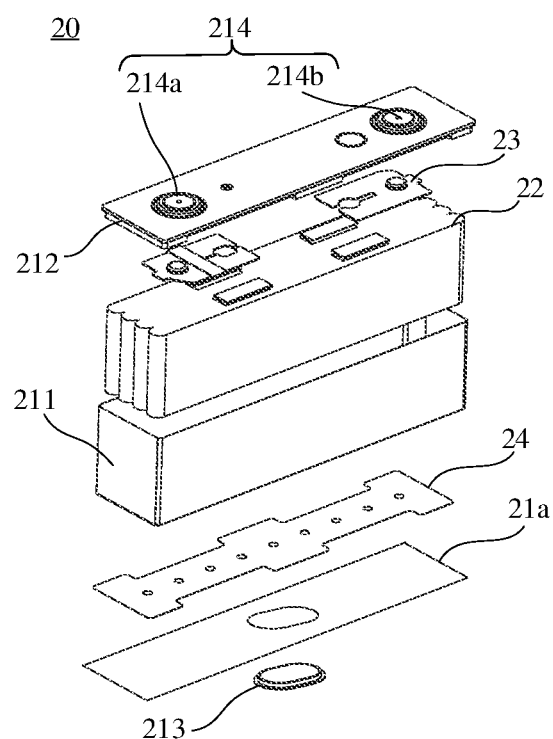
FIG. 5 is a schematic structural diagram of a battery cell according to another embodiment of the present application.

As shown in FIG. 5, it is a schematic structural diagram of a battery cell 20 including a pressure relief mechanism 213 according to another embodiment of the present application.

The housing 211, the cover plate 212, the electrode assembly 22 and the connection member 23 in FIG. 5 are consistent with the housing 211, the cover plate 212, the electrode assembly 22 and the connection member 23 in FIG. 4, which will not be repeated here for brevity.

One wall of the battery cell 20, such as a first wall 21a shown in FIG. 5, may be further provided with a pressure relief mechanism 213. The first wall 21a is a portion of the housing 211, wherein the housing 211 may be formed by the first wall 21a and the remaining portion of the housing 211 in an integral molding process, or formed by blocking an opening on the remaining portion of the housing 211 through the first wall 21a. For convenience of display, the first wall 21a is separated from the housing 211 in FIG. 5, but this does not limit that a bottom side of the housing 211 includes an opening. The pressure relief mechanism 213 is configured to be actuated when an internal pressure or temperature of the battery cell 20 reaches a threshold, to relieve the internal pressure or heat.

The pressure relief mechanism 213 may be a portion of the first wall 21a or is split from the first wall 21a and fixed to the first wall 21a by means of welding, for example. When the pressure relief mechanism 213 is a portion of the first wall 21a, for example, the pressure relief mechanism 213 may be formed by providing an indentation on the first wall 21a, and the thickness of the first wall 21a corresponding to the indentation is smaller than that of other regions of the pressure relief mechanism 213 except the indentation. The indentation is the weakest position of the pressure relief mechanism 213. When excessive gas generated by the battery cell 20 causes the internal pressure of the housing 211 to rise and reach a threshold, or the internal temperature of the battery cell 20 rises and reaches a threshold due to the heat generated by the internal reaction of the battery cell 20, the pressure relief mechanism 213 may be fractured at the indentation, resulting in the communication between the inside and outside of the housing 211. The gas pressure and heat are released outward through the cracking of the pressure relief mechanism 213, thereby preventing the battery cell 20 from exploding.

In some embodiments, as shown in FIG. 5, in the case where the pressure relief mechanism 213 is provided at the first wall 21a of the battery cell 20, a second wall of the battery cell 20 is provided with electrode terminals 214 and is different from the first wall 21a.

In some embodiments, the second wall is arranged opposite to the first wall 21a. For example, the first wall 21a may be a bottom wall of the battery cell 20, and the second wall may be a top wall of the battery cell 20, i.e., the cover plate 212.

In some embodiments, as shown in FIG. 5, the battery cell 20 may also include a backing plate 24. The backing plate 24 is located between the electrode assembly 22 and the bottom wall of the housing 211, may support the electrode assembly 22, and may also effectively prevent the electrode assembly 22 from interfering with rounded corners around the bottom wall of the housing 211. In addition, the backing plate 24 may be provided with one or more through holes, for example, the backing plate may be provided with a plurality of uniformly arranged through holes, or when the pressure relief mechanism 213 is arranged on the bottom wall of the housing 211, through holes are formed in positions corresponding to the pressure relief mechanism 213 for facilitating the guiding of liquid and gas. Specifically, this may communicate spaces of an upper surface and a lower surface of the backing plate 24, and gas generated inside the battery cell 20 and the electrolytic solution may freely pass through the backing plate 24.

The pressure relief mechanism 213 and the electrode terminals 214 are arranged on different walls of the battery cell 20, such that when the pressure relief mechanism 213 is actuated, the emissions from the battery cell 20 may be farther away from the electrode terminals 214, thereby reducing the impact of the emissions on the electrode terminals 214 and the bus component and therefore increasing the safety of the battery.

In some embodiments, when the electrode terminals 214 are arranged on the cover plate 212 of the battery cell 20, the pressure relief mechanism 213 is arranged on the bottom wall of the battery cell 20, such that when the pressure relief mechanism 213 is actuated, the emissions from the battery cell 20 may are discharged to the bottom of the battery 10. In this way, the risk resulting from the emissions may be reduced by using the thermal management component at the bottom of the battery 10, and the harm to users may be reduced because the bottom of the battery 10 is usually far away from the users.

The pressure relief mechanism 213 may be in various possible pressure relief structures, which is not limited in the embodiment of the present application. For example, the pressure relief mechanism 213 may be a temperature-sensitive pressure relief mechanism configured to be capable of being melted when an internal temperature of the battery cell 20 provided with the pressure relief mechanism 213 reaches a threshold; and/or the pressure relief mechanism 213 may be a pressure-sensitive pressure relief mechanism configured to be capable of being fractured when an internal gas pressure of the battery cell 20 provided with the pressure relief mechanism 213 reaches a threshold.

When the pressure relief mechanism 213 is actuated (for example, melted or ruptured), the gas generated by the battery cell 20 and/or the heat generated by internal reaction of the battery cell 20 is released outward through a cracking of the pressure relief mechanism 213, which will cause an internal air pressure of the box that houses the battery cell 20 to increase, and there will be safety risks. In the current pressure relief solution, the emissions inside the box of the battery need to be performed pressure relief by the pressure relief mechanism arranged on the box of the battery. The pressure relief path is longer, and the space available for installing the pressure relief mechanism on the box is limited, resulting in a small pressure relief area, and a low pressure relief efficiency, which in turn leads to the weaker pressure relief ability of the battery.

Thus, an embodiment of the present application provides a technical solution that a first locking mechanism is used to lock a first component and a second component of the box, so as to seal and connect a first interface on the first component and a second interface on the second component.

When the internal pressure of the box is smaller than or equal to a preset value, the first interface and the second interface are in a sealed state. When the internal pressure of the box exceeds the preset value, the first locking mechanism is actuated so that the first interface and the second interface break away from the sealed state, and the internal pressure of the box may be relieved by the interface that breaks away from the sealed state. The first locking mechanism locks the first interface and the second interface, which may not only meet the normal sealing requirement, but may also be actuated when the internal pressure of the box increases, to relieve the pressure through the sealing interface; the first locking mechanism does not need to occupy an additional installation space, may work together with the pressure relief mechanism arranged on the box to increase an pressure relief area, and may also provide a good pressure relief solution when the space reserved for installing the pressure relief mechanism on the box of the battery is too small to install the pressure relief mechanism.

The pressure relief mechanism arranged on the box of the battery is limited by the installation space, and the pressure relief area cannot be large. In the solution provided by the present application, the first locking mechanism is simple in structure, and its installation is not restricted by this, and may achieve a larger pressure relief area on the sealing interface. In addition, the pressure relief from interface is fast, thus improving the relief efficiency and the pressure relief ability of the battery, thereby enhancing the safety of the battery and reducing the safety risks.

Figure 6:
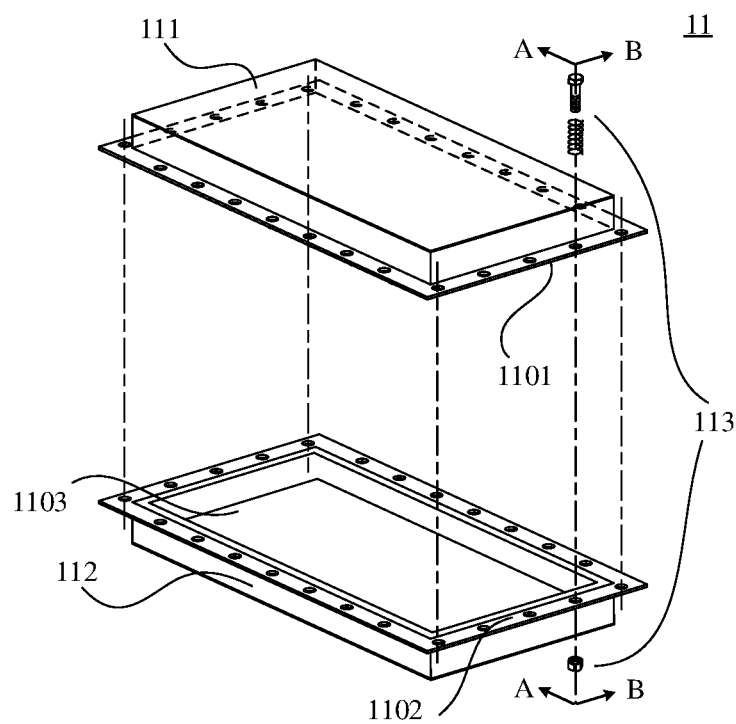
FIG. 6 is an exploded schematic structural diagram of a box of a battery according to an embodiment of the present application.

As shown in FIG. 6, it is an exploded schematic structural diagram of a box of a battery according to an embodiment of the present application. The box 11 includes a first component 111 and a second component 112, and the second component 112 is configured to connect with the first component 111 to form a chamber 1103. The chamber 1103 may be configured to accommodate the above plurality of battery cells 20. The first component 111 includes a first interface 1101. The second component 112 includes a second interface 1102, and the second interface 1102 is arranged opposite to the first interface 1101. In an embodiment of the present application, the first interface 1101 is arranged opposite to the second interface 1102, and the first interface 1101 may contact with or adhere to the second interface 1102.

In an embodiment of the present application, the first interface 1101 may be understood as a surface on the first component 111, for example, referred to as a first surface. The second interface 1102 may be understood as a surface on the second component 112, for example, referred to as a second surface. For convenience of display, the first component 111 and the second component 112 are separated in the figure, but it should be understood that the chamber 1103 is formed by fastening the first component 111 and the second component 112.

Continuing to refer to FIG. 6, the box 11 further includes a first locking mechanism 113, and the first locking mechanism 113 is configured to lock the first component 111 and the second component 112, so that the first interface 1101 and the second interface 1102 are sealed and connected. Among that, the first locking mechanism 113 is configured to be actuated when an internal pressure of the chamber 1103 exceeds a preset value, so that the first interface 1101 and the second interface 1102 break away from a sealed state to relieve the internal pressure of the chamber 1103.

That is to say, when the first locking mechanism 113 locks the first component 111 and the second component 112, the first interface 1101 and the second interface 1102 are in the sealed state; and when the internal pressure of the chamber 1103 exceeds the preset value, the first locking mechanism 113 is actuated so that the first interface 1101 and the second interface 1102 break away from the sealed state. In this way, the internal pressure of the chamber 1103 may be relieved through the gap formed after the first interface 1101 and the second interface 1102 break away from the sealed state; the pressure relief area is large and the pressure relief is fast, thereby reducing the safety risks caused by the increase in the internal pressure of the chamber 1103, and enhancing the safety of the battery. Here, the first locking mechanism is configured to lock the first component and the second component, and does not need to occupy an additional installation space on the box of the battery. Thus, the present application may provide a good pressure relief solution, when the space for installing a pressure relief mechanism on the box of the battery is limited and the pressure relief mechanism cannot be installed.

It should be noted that the structure and number of the first locking mechanism 113 shown in FIG. 6 are only exemplary. In the embodiment of the present application, there are various structural forms of the first locking mechanism 113 for locking the first component 111 and the second component 112, and the number of the first locking mechanism 113 may be one or more, which will be described in detail below with reference to the accompanying drawings.

There are various manners that the first locking mechanism 113 locks the first component 111 and the second component 112.

In some embodiments, the first locking mechanism 113 includes an elastic element, and the elastic element is configured to generate elastic deformation when the internal pressure of the chamber 1103 exceeds the preset value, so that the first interface 1101 and the second interface 1102 break away from the sealed state. A detailed description will be given below with reference to FIG. 7 to FIG. 20. It should be noted that schematic structural diagrams shown in FIG. 7 to FIG. 12 are partial cross-sectional views of the box shown in FIG. 6 when being spilt along the line A-A, and schematic structural diagrams shown in FIG. 13 to FIG. 20 are partial cross-sectional views of the box shown in FIG. 6 when being spilt along the line B-B.

Figure 7:
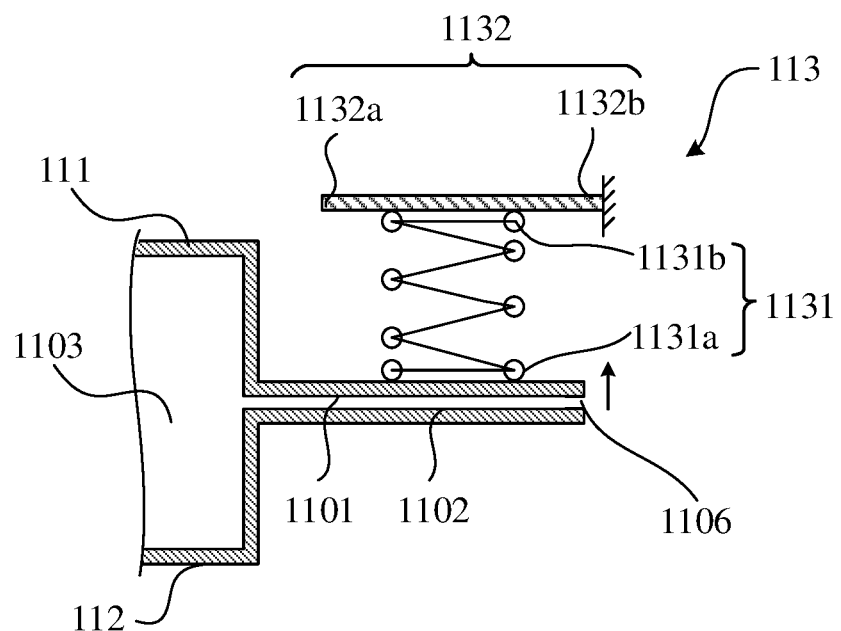
FIG. 7-FIG. 12 are schematic structural diagrams of a first locking mechanism according to some embodiments of the present application.

As shown in FIG. 7, it is a schematic structural diagram of a first locking mechanism according to an embodiment of the present application. The first locking mechanism 113 includes an elastic element 1131 and a supporting member 1132. One end 1131a (for the convenience of description, below the one end 1131a may be also referred to as the first end 1131a) of the elastic element 1131 is configured to abut against one of the first component 111 or the second component 112, and the other end 1131b (for the convenience of description, below the other end 1131b may be also referred to as the second end 1131b) of the elastic element 1131 is configured to abut against the supporting member 1132, to allow the first component 111 or the second component 112 to move relative to the supporting member 1132, when the internal pressure of the chamber 1103 exceeds a preset value.

It should be noted that the first end 1131a and the second end 1131b of the elastic element 1131 refer to two ends of the elastic element 1131 in the direction of elastic deformation. The elastic element 1131 may be a spring (for example, a coil spring), rubber, polyurethane, nylon, or other elastic metal or non-metal materials.

Here, the supporting member 1132 and the component (that is, the first component 111 or the second component 112) abutted by the elastic element 1131 are located on the same side.

For example, referring to FIG. 7, relative to the second component 112, the supporting member 1132 may be located on the same side as the first component 111, and the elastic element 1131 may be arranged between the first component 111 and the supporting member 1132. Correspondingly, the first end 1131a of the elastic element 1131 abuts against the first component 111, and the second end 1131b abuts against the supporting member 1132.

Of course, in some other embodiments, relative to the first component 111, the supporting member 1132 may be located on the same side as the second component 112, and the elastic element 1131 may be arranged between the second component 112 and the supporting member 1132 (that is, the elastic element 1131 and the supporting member 1132 in FIG. 7 are turned 180° in the vertical direction of the paper); and correspondingly, the first end 1131a of the elastic element 1131 abuts against the second component 112, and the second end 1131b abuts against the supporting member 1132.

In an embodiment of the present application, at least one end of the two ends of the supporting member 1132 (for example, a third end 1132a and a fourth end 1132b shown in FIG. 7) is fixed relative to the first component 111 and the second component 112. In some embodiments, one end on the supporting members 1132 that is relatively fixed may also be referred to as a fixed end. For example, the third end 1132a and the fourth end 1132b of the supporting member 1132 may both be fixed ends, or one of the third end 1132a and the fourth end 1132b may be a fixed end, and the other may be a suspended end. The fixed end (the third end 1132a and/or the fourth end 1132b) of the supporting member 1132 may be fixed to another box configured to house the box of the battery. Taking an electric vehicle as an example, the fixed end may be fixed to a housing of the electric vehicle, for example, on a frame.

FIG. 7 actually shows a schematic diagram that the first interface 1101 and the second interface 1102 break away from sealed state, when the internal pressure of the chamber 1103 exceeds the preset value. Taking the structure of the first locking mechanism in FIG. 7 as an example, after the assembly is completed, the initial state of the elastic element 1131 is in a compressed state. The elastic element 1131 applies a preload to the first component 111 and the second component 112. The preload makes the first interface 1101 and the second interface 1102 always be in the sealed state, when the internal pressure of the chamber 1103 does not exceed the preset value. When the internal pressure of the chamber 1103 exceeds the preset value, the first component 111 moves toward the supporting member 1132 under the internal pressure of the chamber 1103 (the black arrow shown in the figure indicates the direction of movement of the first component 111); and the elastic element 1131 is further compressed, and a gap 1106 is formed between the first interface 1101 and the second interface 1102, thereby breaking away from the sealed state. Therefore, the internal pressure of the chamber 1103 may be relieved through the gap 1106.

Specifically, for example, in the normal locked state of the first component 111 and the second component 112, the elastic element 1131 applies a preload with a size of F1 on the sealing interface formed by the first interface 1101 and the second interface 1102 to ensure sealing and connection. When the battery cell undergoes thermal runaway and requires pressure relief, the emissions from the battery cell, such as a runaway gas, will impact the structure on the sealing interface of the box of the battery, generating an impact force with a size of F2 on the sealing interface. When F2 is greater than F1, the first locking mechanism 113 is actuated, the elastic element 1131 is elastically deformed, and the sealing interface locked by the first locking mechanism 113 breaks away from the sealing state to achieve pressure relief and exhaustion. The greater the internal pressure of the chamber 1103, the larger the area opened by the first interface 1101 and the second interface 1102.

"The first locking mechanism is actuated" mentioned in an embodiment of the present application refers to that the first locking mechanism acts or is activated to a certain state, so that the first interface and the second interface locked by the first locking mechanism break away from the sealing state for pressure relief. The action generated by the first locking mechanism may include, but are not limited to: deformation, displacement, or disassembly of at least a portion of the first locking mechanism, and so on. When the first locking mechanism is actuated, high-temperature and high-pressure substances inside the box of the battery are discharged outwards from an interface locked by the first locking mechanism as emissions. In this way, the pressure in the battery cell may be relieved at a controllable pressure or temperature, thereby avoiding potentially more serious accidents.

The first locking mechanism 113 uses the cooperation of the elastic element 1131 and the supporting member 1132 to seal and connect the first interface 1101 and the second interface 1102; and when the internal pressure of the box of the battery exceeds a preset value, the first component 111 or the second component 112 may move relative to the supporting member 1132 under the internal pressure of the box, and compress the elastic element 1131, so that the first interface 1101 and the second interface 1102 break away from the sealed state for pressure relief. The first locking mechanism 113 is simple in structure, and may be installed in a smaller space. The pressure relief is achieved through the interface locked by the first locking mechanism 113, which facilitates the smooth discharge of the emissions from the battery cells.

In some embodiments, during pressure relief, the gap 1106 between the first interface 1101 and the second interface 1102 may reach 5-15 mm. It should be understood that a size of the gap 1106 between the first interface 1101 and the second interface 1102 may be determined according to rigidity of the elastic element 1131 and the preload applied by the elastic element 1131.

The exhaustion and pressure relief are performed through the gap 1106 between the first interface 1101 and the second interface 1102, the exhaustion path is simple, and the exhaustion efficiency may be improved. The first locking mechanism is simple in structure, and there is no need to reserve a larger installation space on the battery, so that the battery structure is more compact.

The elastic element 1131 has sufficient deformability and may open sufficient exhaustion spaces when the pressure is relieved and exhaust. The first locking mechanism 113 of an embodiment of the present application may be detachable and replaceable. It has flame-retardant and high rigidity characteristics, and cannot be set fire or deformed when the battery is performed pressure relief.

Figure 8:
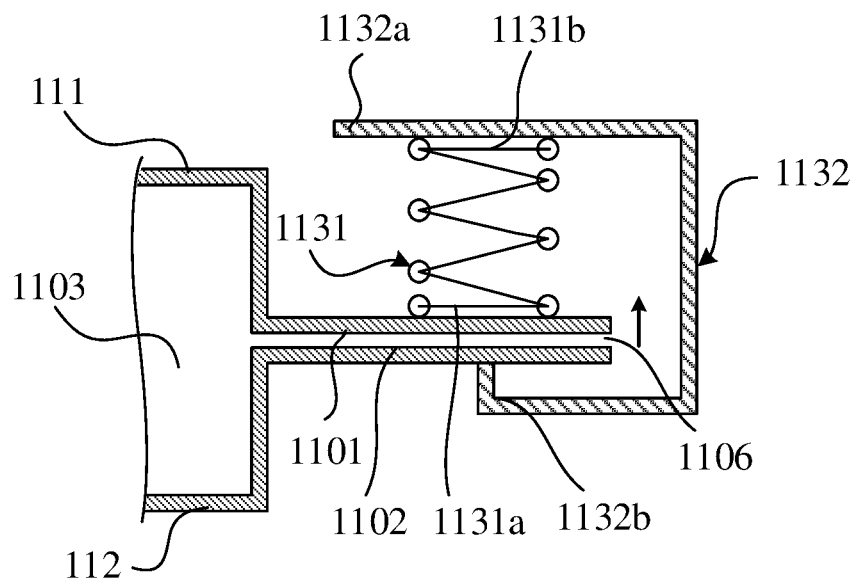

As shown in FIG. 8, it is a schematic structural diagram of another type of first locking mechanism according to an embodiment of the present application. The first component 111, the second component 112, the first interface 1101, the second interface 1102, and the elastic element 1131 in FIG. 8 are consistent with the first component 111, the second component 112, the first interface 1101, the second interface 1102, and the elastic element 1131 in FIG. 7, which will not be repeated here for brevity, and only the differences are described in detail below.

Referring to FIG. 8, one end (for example, the first end 1131a) of the elastic element 1131 is configured to abut against one of the first component 111 and the second component 112, and the other end (for example, the fourth end 1131b) of the elastic element 1131 is configured to abut against the supporting member 1132. Moreover, one end (for example, the third end 1132a) of the supporting member 1132 is configured to abut against the elastic element 1131, and the other end (for example, the fourth end 1132b) of the supporting member 1132 is configured to be attached to the other one of the first component 111 and the second component 112.

Taking the structure of the first locking mechanism shown in FIG. 8 as an example, the first end 1131a of the elastic element 1131 abuts against the first component 111, and the second end 1131b abuts against the supporting member 1132. The third end 1132a of the supporting member 1132 abuts against the elastic element 1131 (for example, specifically abutting against the second end 1131b of the elastic element 1131), and the fourth end 1132b bypasses around outer peripheries of the first component 111 and the second component 112, and is attached to the second component 112.

The elastic element 1131 abuts against one of the first component 111 or the second component 112, one end of the supporting 1132 member abuts against the elastic element 1131, and the other end of the supporting member 1132 is attached to the other one of the first component 111 or the second component 112. In this way, the supporting member 1132 may be fixed on the first component 111 or the second component 112, that is, may be used as a portion of the box of the battery, and there is no need to additionally provide a position for fixing the supporting member 1132 on a component other than the box of the battery, with a simple structure, convenient assembly, and high feasibility.

In some embodiments of the present application, the fourth end 1132b of the supporting member 1132 may be directly connected with the second component 112, for example, the fourth end 1132b of the supporting member 1132 contacts with the second component 112. In some embodiments, the fourth end 1132b of the supporting member 1132 is fixed with the second component 112.

Of course, in some other embodiments, the elastic element 1131 may also be arranged between the second component 112 and the supporting member 1132, one end of the elastic element 1131 abuts against the second component 112, and the other end abuts against the supporting member 1132. One end of the supporting member 1132 abuts against the elastic element 1131, and the other end is attached to the first component 111. The way of attaching the supporting member 1132 to the first component 111 is similar to the way of attaching the supporting member 1132 to the second component 112 shown in FIG. 8. For details, please refer to the relevant description above, which will not be repeated here.

FIG. 8 actually shows a schematic diagram that the first interface 1101 and the second interface 1102 break away from sealed state, when the internal pressure of the chamber 1103 exceeds the preset value. Taking the structure of the first locking mechanism 113 in FIG. 8 as an example, the supporting member 1132 is fixed relative to the second component 112. After the assembly is completed, the initial state of the elastic element 1131 is the compressed state. The elastic element 1131 applies a preload to the first component 111 and the second component 112. The preload makes the first interface 1101 and the second interface 1102 always be in the sealed state, when the internal pressure of the chamber 1103 does not exceed the preset value. When the internal pressure of the chamber 1103 exceeds the preset value, the first component 111 moves toward the direction (for example, the direction indicated by the black arrow shown in FIG. 8) where a portion of the elastic element 1131 abuts against the supporting member 1132 (for example, the third end 1132a of the supporting member 1132) under the internal pressure of the chamber 1103; and the elastic element 1131 is further compressed, and a gap 1106 is formed between the first interface 1101 and the second interface 1102, thereby breaking away from the sealed state. Therefore, the internal pressure of the chamber 1103 may be relieved through the gap 1106.

In some other embodiments of the present application, the fourth end 1132b of the supporting member 1132 may be indirectly connected with the second component 112.

Figure 9:
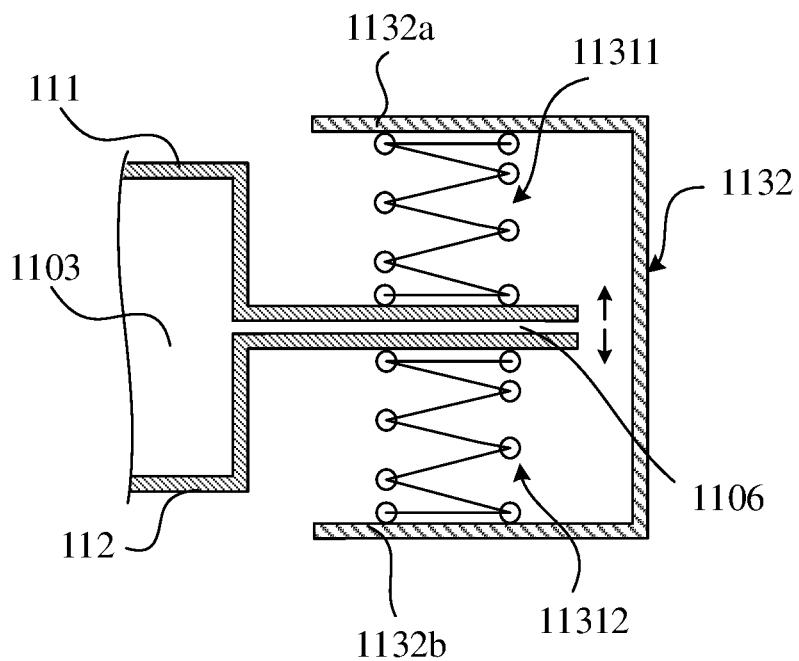

As shown in FIG. 9, it is a schematic structural diagram of another type of first locking mechanism according to an embodiment of the present application. The first locking mechanism 113 includes an elastic element 1131 and a supporting member 1132, wherein the elastic element 1131 includes a first elastic element 11311 and a second elastic element 11312. One end of the first elastic element 11311 abuts against the first component 111, and the other end abuts against the supporting member 1132. One end of the second elastic element 11312 abuts against the second component 112, and the other end abuts against the supporting member 1132. One end (for example, the third end 1132a) of the supporting member 1132 abuts against the first elastic element 11311, and the other end (for example, the fourth end 1132b) abuts against the second elastic element 11312.

To put it simply, the supporting member 1132 shown in FIG. 9 is different from the supporting member 1132 according to FIG. 8 in that the fourth end 1132b of the supporting member 1132 in FIG. 8 is directly connected with the second component 112, so the supporting member 1132 is fixed relative to the second component 112; the fourth end 1132b of the supporting member 1132 in FIG. 9 is attached to the second component 112 through the second elastic element 11312; and since the second elastic element 11312 may be elastically deformed, thus the second component 112 is movable relative to the supporting member 1132.

In the embodiment of the present application, the supporting member 1132 may be connected with other components, such as a housing configured to house the box of the battery, or it may be attached to the first component 111 and the second component 112 only through the first elastic element 11311 and the second elastic element 11312.

FIG. 9 actually shows a schematic diagram that the first interface 1101 and the second interface 1102 break away from sealed state, when the internal pressure of the chamber 1103 exceeds the preset value. Taking the structure of the first locking mechanism 113 in FIG. 9 as an example, after the assembly is completed, initial states of the first elastic element 11311 and the second elastic element 11312 are both compressed state. The first elastic element 11311 and the second elastic element 11312 apply a preload to the first component 111 and the second component 112. The preload makes the first interface 1101 and the second interface 1102 always be in the sealed state, when the internal pressure of the chamber 1103 does not exceed the preset value. When the internal pressure of the chamber 1103 exceeds the preset value, the first component 111 and the second component 112 move in the direction away from each other (for example, the direction indicated by the black arrow shown in FIG. 9) under the internal pressure of the chamber 1103; the first elastic element 11311 and the second elastic element 11312 are further compressed, and a gap 1106 is formed between the first interface 1101 and the second interface 1102, thereby breaking away from the sealed state. Therefore, the internal pressure of the chamber 1103 may be relieved through the gap 1106.

Figure 10:
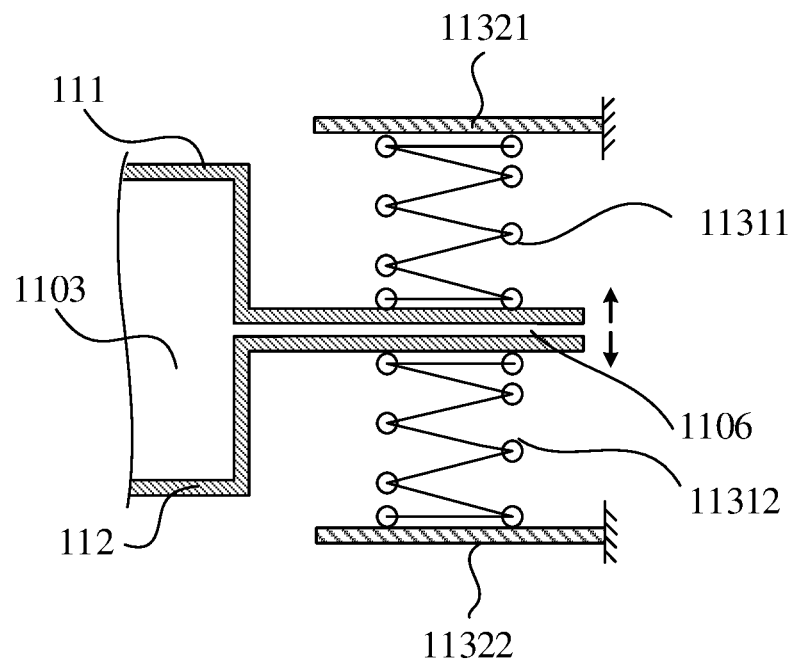

As shown in FIG. 10, it is a schematic structural diagram of another type of first locking mechanism according to an embodiment of the present application. The first locking mechanism 113 includes an elastic element 1131 and a supporting member 1132, wherein the elastic element 1131 includes a first elastic element 11311 and the second elastic element 11312, and the supporting member 1132 includes a first supporting member 11321 and a second supporting member 11322. One end of the first elastic element 11311 abuts against the first component 111, and the other end abuts against the first supporting member 11321. One end of the second elastic element 11312 abuts against the second component 112, and the other end abuts against the second supporting member 11322.

In some embodiments of the present application, the first supporting member 11321 and the second supporting member 11322 may both be fixed to other components, such as a housing configured to house the box of the battery, and the connection manner thereof is similar to that of the supporting member 1132 in FIG. 7. For details, please refer to the relevant description above, which will not be repeated here.

In some other embodiments of the present application, one end of the first supporting member 11321 abuts against the first elastic element 11311 (or one end of the first supporting member 11321 abuts against the first component 111 through the first elastic element 11311), and the other end is fixed to the second component 112 after bypassing around edges and outer peripheries of the first component 111 and the second component 112. One end of the second supporting member 11322 abuts against the second elastic element 11312 (or one end of the second supporting member 11322 abuts against the second component 112 through the second elastic element 11312), and the other end is fixed to the first component 111 after bypassing around edges and outer peripheries of the first component 111 and the second component 112. For details, please refer to the connection manner of the supporting element 1132 in FIG. 8, which will not be repeated here.

FIG. 10 actually shows a schematic diagram that the first interface 1101 and the second interface 1102 break away from sealed state, when the internal pressure of the chamber 1103 exceeds the preset value. Taking the structure of the first locking mechanism 113 in FIG. 10 as an example, initial states of the first elastic element 11311 and the second elastic element 11312 are both compressed state. The first elastic element 11311 and the second elastic element 11312 apply a preload to the first component 111 and the second component 112. The preload makes the first interface 1101 and the second interface 1102 always be in the sealed state, when the internal pressure of the chamber 1103 does not exceed the preset value. When the internal pressure of the chamber 1103 exceeds the preset value, the first component 111 and the second component 112 move in the direction away from each other (for example, the direction indicated by the black arrow shown in FIG. 10) under the internal pressure of the chamber 1103; that is, the first component 111 moves towards the first supporting member 11321, the second component 112 moves towards the second supporting member 11322, the first elastic element 11311 and the second elastic element 11312 are further compressed, and a gap 1106 is formed between the first interface 1101 and the second interface 1102, thereby breaking away from the sealed state. Therefore, the internal pressure of the chamber 1103 may be relieved through the gap 1106.

The first component 111 and the second component 112 are abutted against the first elastic element 11311 and the second elastic element 11312, respectively; and the maximum gap that may be separated between the first component 111 and the second component 112 is the sum of a deformation amount of the first elastic element 11311 and a deformation amount of the second elastic element 11312, which may increase the pressure relief area.

Figure 11:
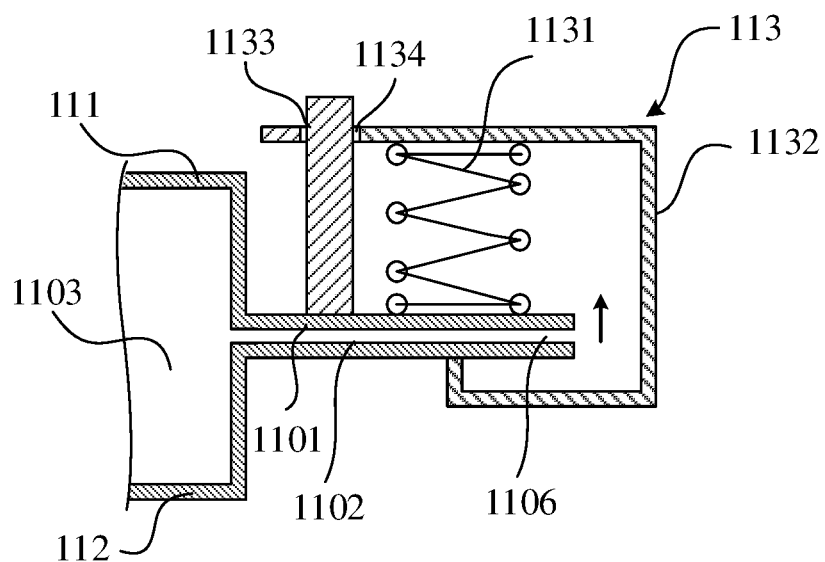

As shown in FIG. 11, it is a schematic structural diagram of another type of first locking mechanism according to an embodiment of the present application. The first component 111, the second component 112, and the elastic element 1131 in FIG. 11 are consistent with the first component 111, the second component 112, and the elastic element 1131 in FIG. 8, which will not be repeated here for brevity, and only the differences are described in detail below.

Referring to FIG. 11, the supporting member 1132 is provided with a guide hole 1134. The first locking mechanism 113 further includes a connecting rod 1133. One end of the connecting rod 1133 is configured to be attached to a same component as the elastic element 1131, the other end of the connecting rod 1133 is configured to pass through the guide hole 1134, so that the connecting rod 1133 moves along an extending direction of the guide hole 1134, when the elastic element 1131 is elastically deformed.

Taking the structure shown in FIG. 11 as an example, the elastic element 1131 is attached to the first component 111, and the connecting rod 1133 is also attached to the first component 111. In some other embodiments, if the elastic element 1131 is attached to the second component 112, the connecting rod 1133 is also attached to the second component 112.

The extending direction of the guide hole 1134 is the same as the direction of the elastic deformation of the elastic element 1131. It should be understood that the extending direction mentioned here refers to a direction perpendicular to the radial direction of the guide hole 1134. Alternatively, if the guide hole 1134 is a round hole, the extending direction of the guide hole may be understood as the axial direction or the depth direction of the guide hole 1134.

In some embodiments, the guide hole 1134 arranged on the supporting member 1132 is a through hole or a blind hole.

The cooperation of the connecting rod 1133 and the guide hole 1134 restricts a deformation direction of the elastic element 1131, and may guide the elastic element 1131 to deform in a direction in which the first interface 1101 and the second interface 1102 are away from each other or approaching each other. The elastic element 1131 has sufficient deformability; and the cooperation with the connecting rod 1133 may open sufficient exhaustion spaces when the pressure is relieved and exhaust.

It should be noted that the first locking mechanism 113 shown in FIG. 11 may be obtained by adding the connecting rod 1133 and the guide hole 1134 on the basis of the first locking mechanism 113 shown in FIG. 8. With respect to the first locking mechanism 113 described in FIG. 7, FIG. 9 and FIG. 10 and the similar structure mentioned above, the connecting rod 1133 and the guide hole 1134 may also be arranged. For the specific setting manner, please refer to the structure shown in FIG. 11, which will not be repeated here one by one for brevity.

In some embodiments of the present application, as shown in FIG. 11, the elastic element 1131 may be arranged on a side of the connecting rod 1133 close to an edge of the first component 111 (or the second component 112) (or away from the chamber 1103), that is, the right side of the connecting rod 1133 in the figure. Of course, the elastic element 1131 may also be arranged in other positions, for example, on a side of the connecting rod 1133 away from the edge of the first component 111 (or the second component 112) (or close to the chamber 1103) (that is, the left side of the connecting rod 1133 in the figure), or in other positions around the connecting rod 1133, which is not limited in the embodiment of the present application.

Figure 12:
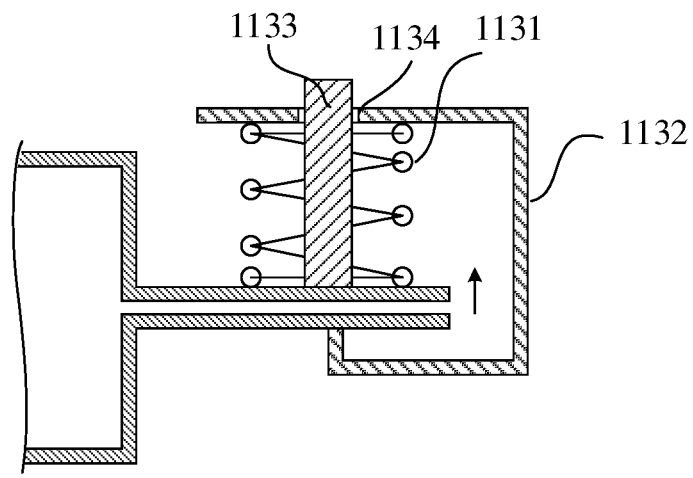

In some embodiments of the present application, as shown in FIG. 12, the elastic element 1131 is configured to be sleeved on the connecting rod 1133. The elastic element 1131 is sleeved on the connecting rod 1133, and the connecting rod 1133 may guide the deformation (for example, compression or stretching) of the elastic element 1131.

Figure 13:
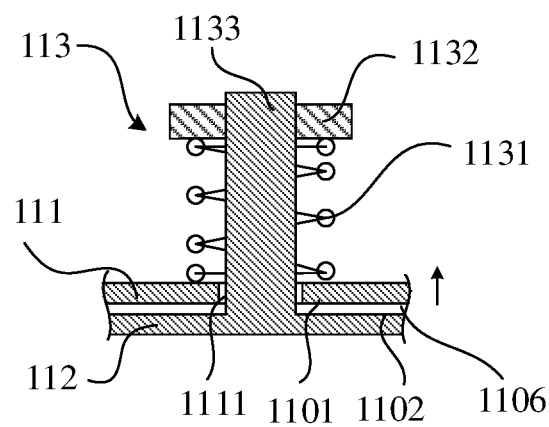
FIG. 13-FIG. 17 are schematic structural diagrams of a first locking mechanism according to some other embodiments of the present application.

As shown in FIG. 13, it is a schematic structural diagram of a first locking mechanism according to another embodiment of the present application. The first locking mechanism 113 includes an elastic element 1131, a supporting member 1132 and a connecting rod 1133. The first component 111 is provided with a first through hole 1111. One end of the connecting rod 1133 is configured to be attached to the second component 112, and the other end is configured to pass through the first through hole 1111 to be attached to the supporting member 1132. One end of the elastic element 1131 is configured to abut against the first component 111, and the other end is configured to abut against the supporting member 1132.

The first through hole 1111 is arranged on the first component 111 for the connecting rod 1133 passing through, and the cooperation of the connecting rod 1133 and the first through hole 1111 may provide a positioning function when the first component 111 and the second component 112 are locked, and facilitate disassembly.

In the embodiment of the present application, the connecting rod 1133 passes through the first through hole 1111, one end thereof is connected with the second component 112, and the other end is connected with the supporting member 1132, and the supporting member 1132 and the second component 112 are fixed relative to the connecting rod 1133. The second component 112 and the connecting rod 1133 may be fixedly connected, detachably connected or integrally connected, which is not limited in the embodiment of the present application. Exemplarily, the connecting rod 1133 may be integrally formed with the second component 112, or the connecting rod 1133 may be welded or adhered to the second component 112, or the like, as an individual component. Similarly, the supporting member 1132 and the connecting rod 1133 may be fixedly connected, detachably connected or integrally connected, which is not limited in the embodiment of the present application.

In some embodiments, the setting manner of the elastic element 1131 and the connecting rod 1133 may be similar to that of the elastic element 1131 and the connecting rod 1133 in FIG. 11, that is, the elastic element 1131 and the connecting rod 1133 are arranged adjacently, the elastic element 1131 is located on one side of the connecting rod 1133, and an area enclosed by projection of the elastic element 1131 on the first interface 1101 and an area enclosed by projection of the connecting rod 1133 on the first interface 1101 do not overlap.

In some embodiments, the setting manner of the elastic element 1131 and the connecting rod 1133 may be similar to that of the elastic element 1131 and the connecting rod 1133 in FIG. 12, that is, the elastic element 1131 is sleeved on the connecting rod 1133.

FIG. 13 actually shows a schematic diagram that the first interface 1101 and the second interface 1102 break away from sealed state, when the internal pressure of the chamber 1103 exceeds the preset value. Taking the structure of the first locking mechanism 113 in FIG. 13 as an example, an initial state of the elastic element 1131 is compressed state, which applies a preload to the first component 111 and the second component 112. The preload makes the first interface 1101 and the second interface 1102 always be in the sealed state, when the internal pressure of the chamber 1103 does not exceed the preset value. When the internal pressure of the chamber 1103 exceeds the preset value, since the second component 112 and the supporting member 1132 are fixed relatively, the first component 111 moves toward the direction of the supporting member 1132 under the internal pressure of the chamber 1103 (for example, the direction indicated by the black arrow shown in FIG. 13); and a gap 1106 is formed between the first interface 1101 and the second interface 1102, thereby breaking away from the sealed state. Therefore, the internal pressure of the chamber 1103 may be relieved through the gap 1106.

Figure 14:
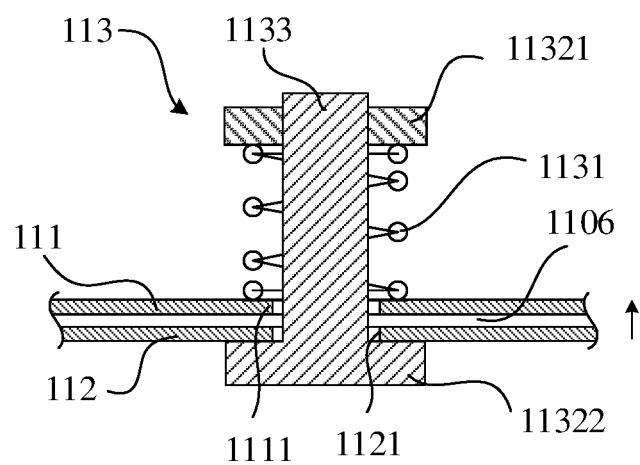

In some embodiments of the present application, as shown in FIG. 14, the second component 112 is provided with a second through hole 1121, and the connecting rod 1133 is configured to pass through the first through hole 1111 and the second through hole 1121, to connect with the first component 111 and the second component 112.

Both the first component 111 and the second component 112 are provided with through holes to facilitate the installation of the connecting rod 1133, to lock the first component 111 and the second component 112.

Continuing to refer to FIG. 14, in some embodiments, the first locking mechanism 113 includes an elastic element 1131, a connecting rod 1133 and a supporting member 1132, wherein the supporting member 1132 includes a first supporting member 11321 and a second supporting member 11322. The connecting rod 1133 passes through the first through hole 1111 and the second through hole 1121, one end thereof is configured to be attached to the first supporting member 11321, and the other end thereof is configured to be attached to the second supporting members 11322. The second supporting member 11322 is configured to abut against the second component 112. One end of the elastic element 1131 is configured to abut against the first component 111, and the other end is configured to abut against the first supporting member 11321.

In this way, under the joint action of the elastic element 1131 as well as the first supporting member 11321 and the second supporting member 11322, the first component 111 and the second component 112 are locked together. When the internal pressure of the chamber 1103 does not exceed the preset value, the first interface 1101 and the second interface 1102 are always in the sealed state under the preload of the elastic element 1131. Since the second supporting member 11322 abuts against the second component 112, the second supporting member 11322 and the second component 112 may be separated from each other, and the connecting rod 1133 may be repeatedly installed, which facilitates maintenance.

It should be understood that in the first locking mechanism shown in FIG. 13 and FIG. 14, the elastic element 1131 may also abut against the second component 112, so that the second component 112 moves in a direction away from each other in relative to the first component 111, when the internal pressure of the chamber 1103 exceeds a preset value. The setting manners of other components may be adjusted adaptively, which will not be described in detail here.

Figure 15:
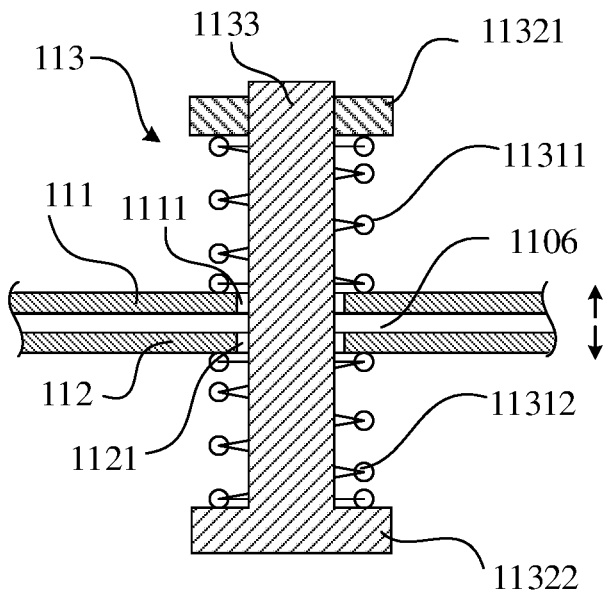

As shown in FIG. 15, it is a schematic structural diagram of a first locking mechanism according to another embodiment of the application. The first locking mechanism 113 includes a connecting rod 1133, an elastic element 1131, and a supporting member 1132, wherein the elastic element 1131 includes a first elastic element 11311 and a second elastic element 11312, and the supporting member 1132 includes a first supporting member 11321 and a second supporting member 11322. The first component 111 is provided with a first through hole 1111, and the second component 112 is provided with a second through hole 1121. The connecting rod 1133 passes through the first through hole 1111 and the second through hole 1121. Among that, one end of the connecting rod 1133 is configured to be attached to the first supporting member 11321, and the other end is configured to be attached to the second supporting member 11322. The first elastic element 11311 is arranged between the first component 111 and the first supporting member 11321, wherein one end of the first elastic element 11311 is configured to abut against the first component 111, and the other end is configured to abut against the first supporting member 11321. In the assembled state, the first elastic element 11311 is in a compressed state. The second elastic element 11312 is arranged between the second component 112 and the second supporting member 11322, wherein one end of the second elastic element 11312 is configured to abut against the second component 112, and the other end is configured to abut against the second supporting member 11322. In the assembled state, the second elastic element 11312 is in a compressed state. When the internal pressure of the chamber 1103 exceeds the preset value, the first elastic element 11311 and the second elastic element 11312 may be further compressed due to the first component 111 and the second component 112 moving in a direction away from each other (for example, the direction indicated by the black arrow shown in FIG. 15). A gap 1106 may be formed between the first component 111 and the second component 112, and the internal pressure of the chamber 1103 may be relieved from the gap 1106.

The working process and principle of the first locking mechanism in FIG. 15 are similar to that of the first locking mechanism 113 in FIG. 9 or FIG. 10, which is will not be repeated here for brevity.

In some embodiments of the present application, as shown in FIG. 15, the first elastic element 11311 and the second elastic element 11312 are both sleeved on the connecting rod 1133.

Figure 16:
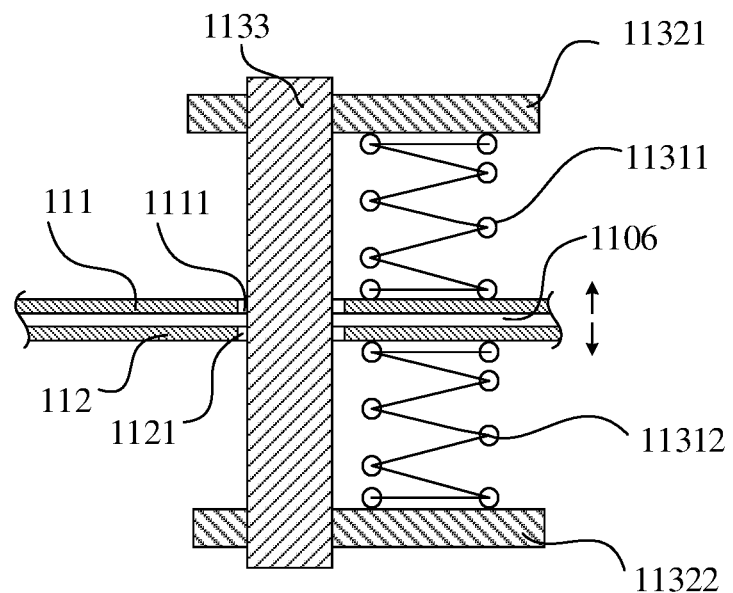

In some other embodiments of the present application, as shown in FIG. 16, the first elastic element 11311 and the second elastic element 11312 may not be sleeved on the connecting rod 1133. For example, the first elastic element 11311 and the second elastic element 11312 are arranged around the connecting rod 1133.

In some embodiments, the first component 111 may be provided with a plurality of first through holes 1111, or the second component 112 may be provided with a plurality of second through holes 1121. The first elastic element 11311 may be arranged on a line connecting centers of the plurality of first through holes 1111. The second elastic element 11312 may be arranged on a line connecting centers of the plurality of second through holes 1121. Alternatively, there are a plurality of connecting rods 1133 configured to lock the first component 111 and the second component 112, and the first elastic element 11311 or the second elastic element 11312 may be arranged on a line connecting a plurality of connecting rods 1133. In this way, the width of the locked edges of the first component 111 and the second component 112 in the direction toward the chamber 1103 does not need to be large, thereby saving the space and reducing the weight of the box of the battery.

It should be understood that setting positions of the first elastic element 11311 and the second elastic element 11312 are similar to that of the elastic element 1311 in FIG. 11, that is, may be located in other positions around the connecting rod 1133, which is not limited in the embodiment of the present application.

In the embodiment of the present application, the first supporting member 11321 and the second supporting member 11322 may be fixedly connected with the connecting rod 1133, may be detachably connected (for example, the connection manner of the first supporting member 11321 and the connecting rod 1133 in FIG. 15), and may also be integrally connected (for example, the connection manner of the second supporting member 11322 and the connecting rod 1133 in FIG. 15), which is not limited in the embodiment of the present application.

Exemplarily, as shown in FIG. 15, the connecting rod 1133 and the second supporting member 11322 may be capped bolts, wherein the connecting rod 1133 is a screw, and the second supporting member 11332 is a fixed nut. Correspondingly, the first supporting member 11321 may be a movable nut.

Exemplarily, as shown in FIG. 16, the connecting rod 1133 may be a threaded polished rod, and the first supporting member 11321 and the second supporting member 11322 are both movable nuts. The connecting rod 1133 may be provided with threads connected with the first supporting member 11321 and the second supporting member 11322 at both ends, or all the rod bodies may be provided with threads.

The first locking mechanism 113 adopts bolts and nuts (also referred to as caps) to corporate, or threaded polished rods and nuts to corporate, to lock the first component 111 and the second component 112, to facilitate assembly and disassembly.

Figure 17:
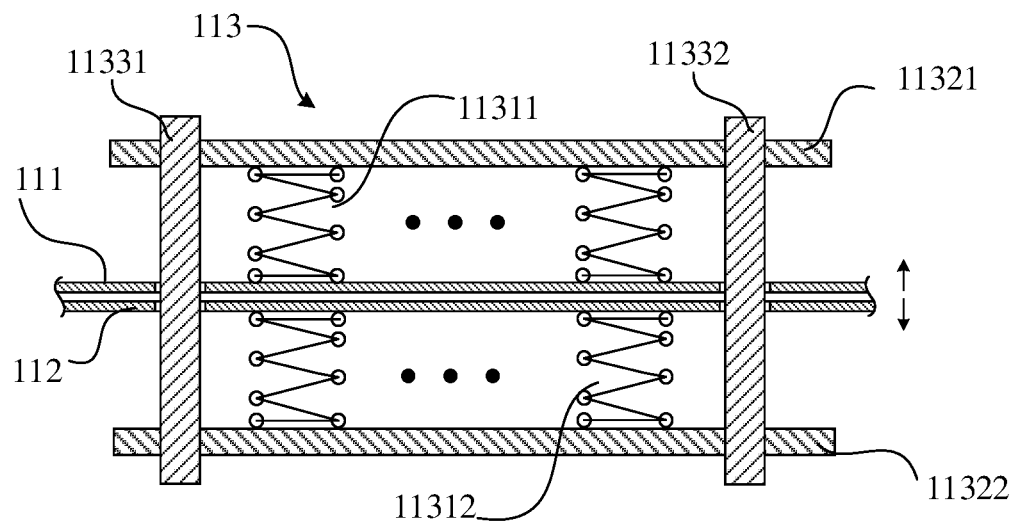

As shown in FIG. 17, it is a schematic structural diagram of a first locking mechanism according to another embodiment of the present application. The first locking mechanism 113 includes a connecting rod 1133, an elastic element 1131, and a supporting member 1132, wherein the connecting rod 1133 includes a first connecting rod 11331 and a second connecting rod 11332, the elastic element 1131 includes a first elastic element 11311 and a second elastic element 11312, and the supporting member 1132 includes a first supporting member 11321 and a second supporting member 11322. The first connecting rod 11331 passes through through holes arranged on the first component 111 and the second component 112, one end thereof is configured to be attached to the first supporting member 11321, and the other end thereof is configured to be attached to the second supporting member 11322. The second connecting rod 11332 passes through another set of through holes arranged on the first component 111 and the second component 112, one end thereof is configured to be attached to the first supporting member 11321, and the other end thereof is configured to be attached to the second supporting member 11322. The first elastic element 11311 and the second elastic element 11312 are arranged between the first connecting rod 11331 and the second connecting rod 11332. Among that, one end of the first elastic element 11311 is configured to abut against the first component 111, and the other end is configured to abut against the first supporting member 11321. One end of the second elastic element 11312 is configured to abut against the second component 112, and the other end is configured to abut against the second supporting member 11322.

In some embodiments, the elastic element 1131 includes a plurality of first elastic elements 11311. The plurality of first elastic elements 11311 are arranged between the first connecting rod 11331 and the second connecting rod 11332, wherein one end of each of the first elastic element 11311 is configured to abut against the first component 111, and the other end is configured to abut against the first supporting member 11321.

In some embodiments, the elastic element 1131 includes a plurality of second elastic elements 11312. The plurality of second elastic elements 11312 are arranged between the first connecting rod 11331 and the second connecting rod 11332, wherein one end of each of the second elastic elements 11312 is configured to abut against the second component 112, and the other end is configured to abut against the second supporting member 11322.

In some embodiments of the present application, the plurality of first elastic elements 11311 are arranged in a straight line, and the plurality of second elastic elements 11312 are arranged in a straight line.

In some embodiments of the present application, the plurality of first elastic elements 11311 are located on a line connecting the first connecting rod 11331 and the second connecting rod 11332. The plurality of second elastic elements 11312 are located on a line connecting the first connecting rod 11331 and the second connecting rod 11332. In this way, the width of the locked edges of the first component 111 and the second component 112 in the direction toward the chamber 1103 does not need to be large, thereby saving the space and reducing the weight of the box of the battery.

In the embodiment of the present application, a plurality of first elastic elements 11311 and a plurality of second elastic elements 11312 are arranged between the first connecting rod 11331 and the second connecting rod 11332. In this way, the locking of the first component 111 and the second component 112 may be achieved by setting fewer connecting rods 1133, with a simple structure and convenient disassembly.

In each of the above embodiments, the elastic element 1131 (including the first elastic element 11311 or the second elastic element 11312) is in a compressed state, and its two ends respectively abut against other components, for example, the two ends of the elastic element 1131 in FIG. 13 respectively abut against the first component 111 and the supporting member 1132; for example, the two ends of the first elastic element 11311 in FIG. 15 respectively abut against the first component 111 and the first supporting member 11321, and the two ends of the second elastic element 11312 respectively abut against the second component 112 and the second supporting member 11322. In order to increase an area acted by the force of the elastic element 1131 and reduce the stress concentration on other components, in the embodiment of the present application, the first locking mechanism 113 may further include an abutment member, the abutment member is arranged between the elastic element 1131 and other components that abut against the elastic element 1131 in the above embodiments, and the elastic element 1131 directly abuts against the abutment member so that the force of the elastic element 1131 may be indirectly transmitted to other components through the abutment member.

In some embodiments, the first locking mechanism 113 includes one or more abutment members. That is, in any one of the embodiments described in FIG. 7 to FIG. 17, at least one abutment surface abutting against the elastic element 1131 is provided with an abutment member, so that the elastic element 1131 abuts against the abutment surface through the abutment member. It should be understood that the abutment surface mentioned here refers to a surface on other components that abuts against the elastic element 1131 without arranging an abutment member. When no abutment member is arranged, these abutment surfaces may be understood as abutment surfaces that directly abut against the elastic element 1131. After the abutment members are arranged, these abutment surfaces may be understood as abutment surfaces that indirectly abut against the elastic element 1131.

In some embodiments, an area where the abutment member contacts with other components is larger than an area where the elastic element 1131 contacts with the abutment member, thereby alleviating the problem of stress concentration on other components. To facilitate understanding, it is described below combined with the accompanying drawings.

Figure 18:
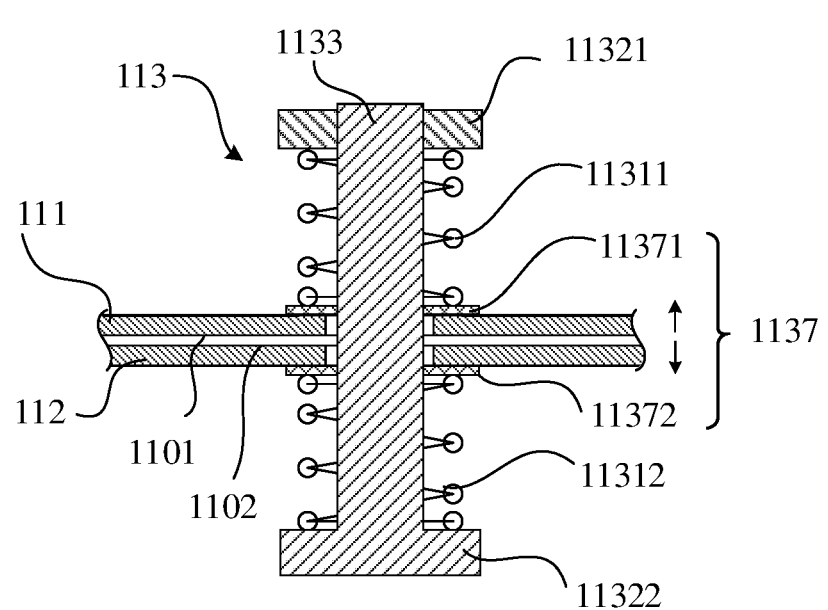
FIG. 18-FIG. 20 are schematic structural diagrams of a first locking mechanism according to some other embodiments of the present application.

As shown in FIG. 18, it is a schematic structural diagram of a first locking mechanism according to another embodiment of the application. The first locking mechanism 113 includes a connecting rod 1133, an elastic element 1131, a supporting member 1132 and an abutment member 1137, wherein the elastic element 1131 includes a first elastic element 11311 and a second elastic element 11312, the supporting member 1132 includes a first supporting member 11321 and a second supporting member 11322, and the abutment member 1137 includes a first abutment member 11371 and a second abutment member 11372. Among that, the connecting rod 1133 passes through through holes arranged on the first component 111 and the second component 112, one end thereof is configured to be attached to the first supporting member 11321, and the other end thereof is configured to be attached to the second supporting member 11322. The first abutment member 11371 is arranged on a surface opposite to the first interface 1101 on the first component 111, one end of the first elastic element 11311 is configured to abut against the first abutment member 11371, and the other end is configured to abut against the first supporting member 11321. The second abutment members 11372 is arranged on a surface opposite to the second interface 1102 on the second component 112, one end of the second elastic element 11312 is configured to abut against the second abutment member 11372, and the other end is configured to abut against the second supporting member 11322.

In this case, the first elastic element 11131 abuts against the first component 111 through the first abutment member 11371, wherein an area where the first abutment member 11371 contacts with the first component 111 is larger than an area where the first abutment member 11371 contacts with the first elastic element 11311. Similarly, the second elastic elements 11312 abuts against the second component 112 through the second abutment member 11372, wherein an area where the second abutment member 11372 contacts with the second component 112 is larger than an area where the second abutment member 11372 contacts with the second elastic element 11312.

In some embodiments of the present application, the abutment member 1137 may be a sheet-shaped member.

Figure 19:
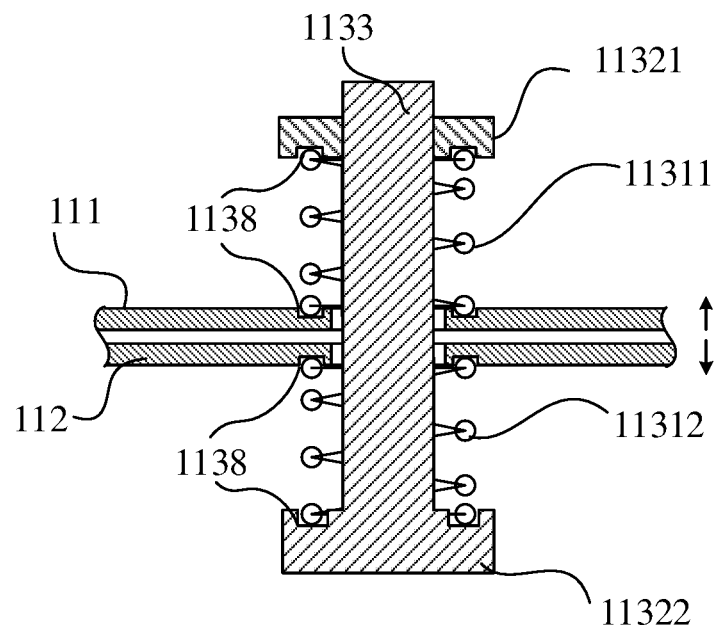

As shown in FIG. 19, it is a schematic structural diagram of a first locking mechanism according to another embodiment of the application. The connecting rod 1133, the first elastic element 11311, the second elastic elements 11312 in FIG. 19 are consistent with the connecting rod 1133, the first elastic element 11311, the second elastic elements 11312 in FIG. 15, which will not be repeated here for brevity, and only the differences are described in detail below.

Referring to FIG. 19, a side on the first supporting member 11321 facing the first elastic element 113111 (that is, the side abutting against the first elastic element 11311), and a side on the first component 111 facing the first elastic element 11311 (that is, the side abutting against the first elastic element 11311) are provided with a restraint part 1138, and the restraint part 1138 is configured to limit the movement of the first elastic element 11311 perpendicular to the elasticity direction of the first elastic element 11311. Similarly, a side on the second supporting member 11322 facing the second elastic element 11312 (that is, the side abutting against the second elastic element 11312), and a side on the second component 112 facing the second elastic element 11312 (that is, the side abutting against the second elastic element 11312) are provided with a restraint part 1138, and the restraint part 1138 is configured to limit the movement of the second elastic element 11312 perpendicular to the elasticity direction of the first elastic element 11312.

It should be understood that the setting position of the restraint part 1138 in FIG. 19 is only exemplary. In some other embodiments, the restraint part 1138 may be arranged on at least one abutment surface (herein referred to an abutment surface directly abutting against the elastic element 1131) configured to abut against the elastic element 1131, the restraint part 1138 is configured to restrict the movement of the elastic element 1131 (for example, including the first elastic element 11311, the second elastic element 11312, etc.) perpendicular to the elasticity direction (for example, the horizontal direction of the paper) of the elastic element 1131. That is, the restraint part 1138 may cooperate with the elastic element 1131 to position the elastic element.

Exemplarily, in the case that the elastic element 1131 indirectly abuts against other components through the abutment member 1137, a restraint part 1138 may be arranged on the abutment member.

Figure 20:
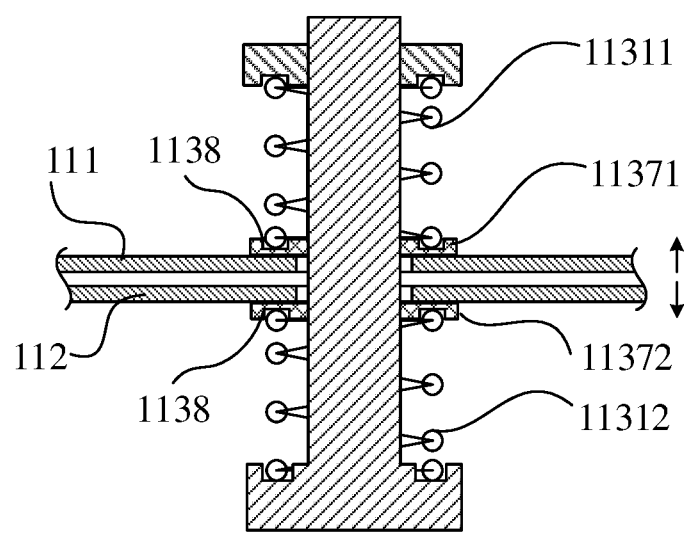

As shown in FIG. 20, it is a schematic structural diagram of a first locking mechanism according to another embodiment of the application. Here, the structure shown in FIG. 20 is taken as an example to describe in detail the setting manner of the restraint part 1138 on the abutment member 1137. As shown in FIG. 20, the elastic element 1131 includes a first elastic element 11311 and a second elastic element 11312. The abutment member 1137 includes a first abutment member 11371 and a second abutment member 11372. Among that, the first elastic element 11311 abuts against the first component 111 through the first abutment member 11371, and the second elastic element 11312 abuts against the second component 112 through the second abutment member 11372. Exemplarily, an abutment surface on the first abutment member 11371 abutting against the first elastic element 11311 is provided with a restraint part 1138, configured to restrict the movement of the first elastic element 11311. An abutment surface on the second abutment member 11372 abutting against the second elastic element 11312 is provided with a restraint part 1138, configured to restrict the movement of the second elastic element 11312.

Figure 21:
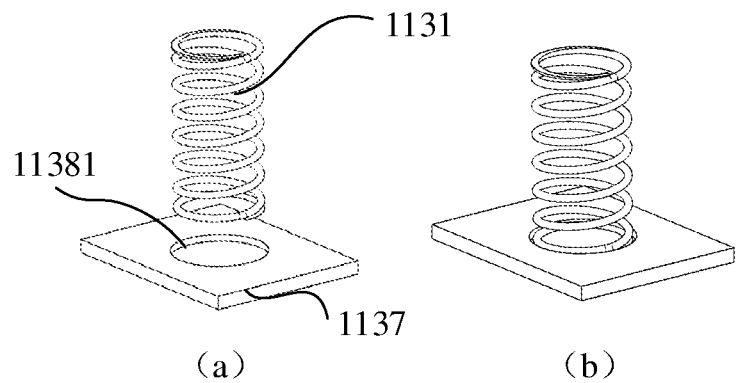
FIG. 21-FIG. 23 are schematic structural diagrams of a restraint part according to some embodiments of the present application.

In some embodiments of the present application, as shown in FIG. 21, the restraint part 1138 in the above embodiments includes a recess 11381, and the recess 11381 is configured to house an end of the elastic element 1131 corresponding to the restraint part 1138. In FIG. 21, taking the restraint part 1138 arranged on the abutment member 1137 as an example, (a) and (b) in FIG. 21 respectively show a schematic diagram of separation and a schematic diagram of assembly of the elastic element 1131 and the abutment member 1137.

In some embodiments, the recess 11381 may be a circular recess. As shown in FIG. 21, the bottom wall of the circular recess abuts against the end of the elastic element 1131, and the side wall of the circular recess may limit the outer side of end of the elastic element 1131, to limit the movement of the elastic element 1131 perpendicular to the elasticity direction.

In some embodiments, the recess 11381 may be an annular recess. As shown in (a) and (b) of FIG. 22, the bottom wall of the annular recess abuts against the end of the elastic element 1131, and the two opposite side walls on the annular recess respectively limit the inner side and the outer side of the end of the elastic element 1131, which in turn may limit the movement of the elastic element 1131 perpendicular to the elasticity direction. In the embodiment of the present application, the inner side of the elastic element 1131 may be understood as a side of the elastic element 1131 opposite to the connecting rod 1133, or a side that may contact with the connecting rod 1133, when the elastic element 1131 is sleeved on the connecting rod 1133. The outer side of the elastic element 1131 may be understood as a side opposite to the inner side of the elastic element 1131 perpendicular to the elasticity direction.

Figure 22:
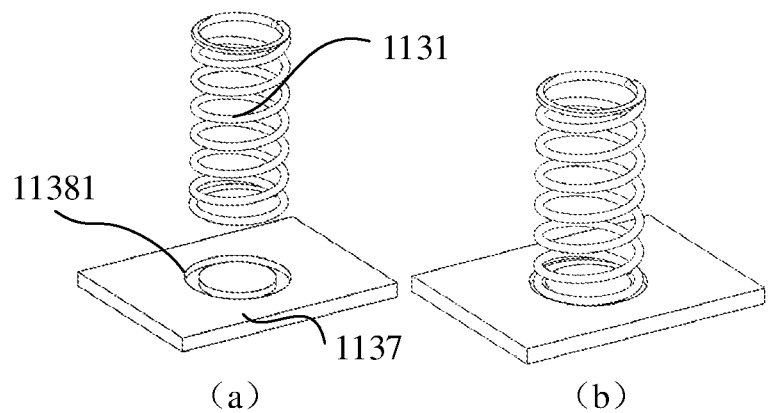

It should be understood that the shape of the recess 11381 may be designed according to the shape of the end of the elastic element correspondingly, and the shapes of the recess shown in FIG. 21 and FIG. 22 are only exemplary illustrations.

The recess 11381 may provide a positioning function; and the bottom wall of the recess 11381 may provide a locking surface, to abut against the elastic element 1131.

Figure 23:
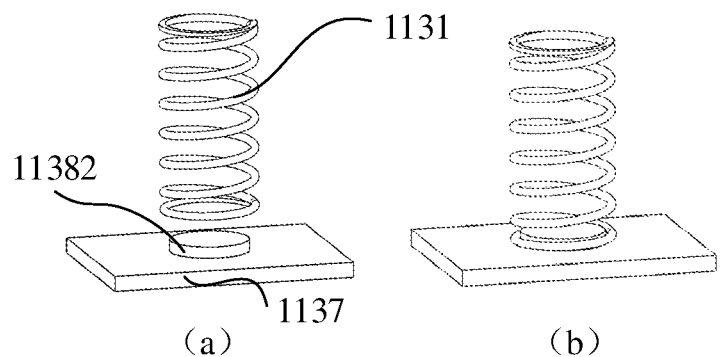

In some embodiments of the present application, as shown in FIG. 23, the restraint part 1138 in the above embodiments includes a protrusion 11382, wherein an end of the elastic element 1131 corresponding to the restraint part 1138 is sleeved on the protrusion 11382. In FIG. 23, taking the restraint part 1138 arranged on the abutment member 1137 as an example, (a) and (b) in FIG. 23 respectively show a schematic diagram of separation and a schematic diagram of assembly of the elastic element 1131 and the abutment member 1137.

In some embodiments, the protrusion 11382 may be a cylindrical protrusion. As shown in FIG. 23, the end of the elastic element 1131 is sleeved on the cylindrical protrusion and abuts against the abutment member 1137. The side wall of the cylindrical protrusion may limit the inner side of the end of the elastic element 1131, so as to limit the movement of the elastic element 1131 perpendicular to the elasticity direction.

Figure 24:
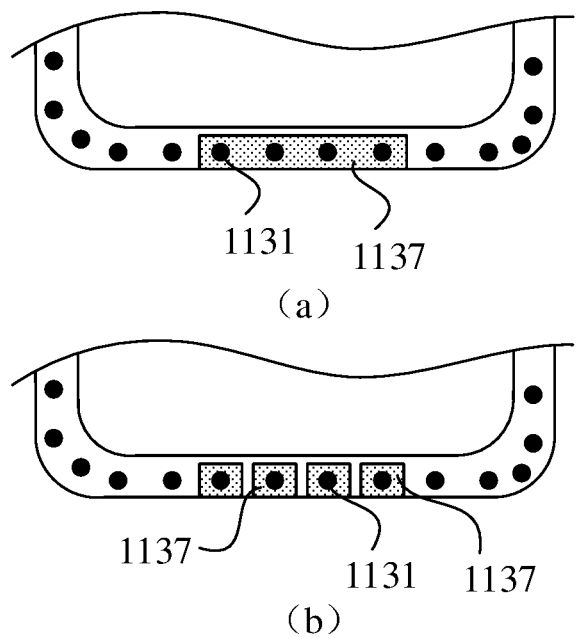
FIG. 24 is a schematic structural diagram of an abutment member according to an embodiment of the present application.

As shown in FIG. 24, it is a schematic structural diagram of an abutment member according to an embodiment of the present application; and in the figure, the black dot is configured to indicate the position where the elastic element 1131 is, and the filling block is configured to indicate the position where the abutment member 1137 is.

As shown in (a) of FIG. 24, the abutment member 1137 may correspond to a plurality of elastic elements 1131. It should be understood that here the corresponding abutment member 1137 and elastic element 1131 abut against each other. Specifically, taking the first locking mechanism 113 in FIG. 20 as an example, the elastic element 1131 includes a first elastic element 11311 and a second elastic element 11312, and the abutment member 1137 includes a first abutment member 11371 and a second abutment member 11372. The first elastic element 11311 abuts against the first abutment member 11371, and the second elastic element 11312 abuts against the second abutment member 11372. Therefore, for the first locking mechanism in FIG. 20, the first abutment member 11371 may correspond to a plurality of first elastic elements 11311, and the second abutment member 11372 may correspond to a plurality of second elastic elements 11312.

In some embodiments, the abutment member 1137 has a strip shape, and in some embodiments, it may also be referred to as a "batten". It should be understood that other shapes of the abutment member 1137 may be determined according to the setting position of the elastic element 1131, which is not limited in the embodiment of the present application.

When the abutment member 1137 corresponds to a plurality of elastic elements 1131, the elastic force of the plurality of elastic elements 1131 may be transmitted to the sealing interface through the abutment member 1137, which may increase the locking contact area between the elastic element 1131 and the sealing interface, reduce the stress concentration, and improve reliability. In particular, for the first locking mechanism 113 shown in FIG. 17, the abutment member 1137 may correspond to a plurality of elastic elements (for example, a plurality of the first elastic elements 11311 or a plurality of the second elastic elements 11312) between the first connecting rod 11331 and the second connecting rod 11332, and the abutment member 1137 does not need to be punched, and the installation is convenient.

As shown in (b) of FIG. 24, the abutment member 1137 may one-to-one correspond to the elastic element 1131. It should be understood that here the corresponding abutment member 1137 and elastic element 1131 abut against each other. Specifically, still taking the first locking mechanism in FIG. 20 as an example, the first abutment member 11371 may one-to-one correspond to the first elastic element 11311, and the second elastic element 11372 may one-to-one correspond to the second elastic element 11312.

It should be understood that other shapes of the abutment member 1137 may be determined according to the shape of the end of the elastic element 1131, which is not limited in the embodiment of the present application.

When the abutment member 1137 one-to-one corresponds to the elastic element 1131, the elastic force of the elastic element 1131 may be transmitted to the sealing interface through the abutment member 1137, which may increase the locking contact area between the elastic element and the sealing interface, reduce the stress concentration, and improve reliability. In addition, the weight of the structure may be reduced. When the abutment member shown in (b) in FIG. 24 is adopted, one abutment member 1137 may correspond to an installation hole of one connecting rod 1133, and there is no need to correspond to mounting holes of a plurality of connecting rods one by one, which reduces installation and positioning requirements.

In each of the above embodiments, the first component 111 and the second component 112 are locked by the elastic force generated by the elastic element 1131 in a compressed state; and in some other embodiments, the first component 111 and the second component 112 may be locked by the elastic force generated by the elastic element 1131 in a stretched state.

Figure 25:
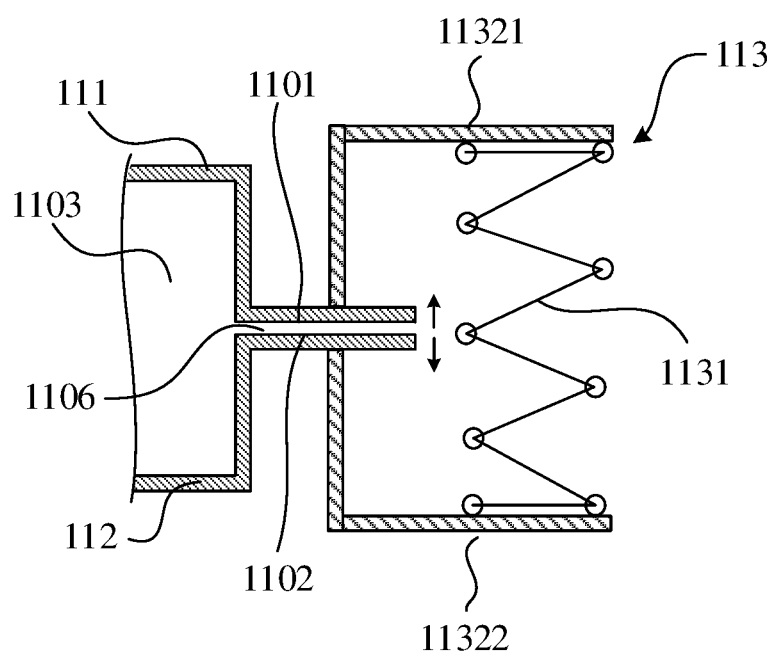
FIG. 25 is a schematic structural diagram of a first locking mechanism according to an embodiment of the present application.

As shown in FIG. 25, it is a schematic structural diagram of a first locking mechanism according to another embodiment of the application. The first locking mechanism 113 includes an elastic element 1131, wherein one end of the elastic element 1131 is configured to be attached to the first component 111, and the other end is configured to be attached to the second component 112. The elastic element 1131 is configured to always be in a stretched state, when the first interface 1101 and the second interface 1102 maintain in the sealed state and break away from the sealed state.

In some embodiments, continuing to refer to FIG. 25, the first locking mechanism 113 further includes a first supporting member 11321 and a second supporting member 11322. Among that, one end of the first supporting member 11321 is configured to connect with the first component 111, and the other end is configured to connect with one end of the elastic element 1131. One end of the second supporting member 11322 is configured to connect with the second component 112, and the other end is configured to connect with the other end of the elastic element 1131.

It should be understood that there are other manners of attaching the elastic element 1131 to the first component 111 and the second component 112. For ease of understanding, here it is only an exemplary description.

FIG. 25 actually shows a schematic diagram that the first interface 1101 and the second interface 1102 break away from sealed state, when the internal pressure of the chamber 1103 exceeds the preset value. Taking the structure of the first locking mechanism in FIG. 25 as an example, an initial state of the elastic element 1131 is a stretched state, and the elastic force generated by the elastic element 1131 is transmitted to the first component 111 and the second component 112 through the first supporting member 11321 and the second supporting member 11322, thereby applying a preload to the first component 111 and the second component 112. The preload makes the first interface 1101 and the second interface 1102 always be in the sealed state, when the internal pressure of the chamber 1103 does not exceed the preset value. When the internal pressure of the chamber 1103 exceeds the preset value, the first component 111 and the second component 112 move in the direction away from each other (for example, the direction indicated by the black arrow shown in FIG. 25) under the internal pressure of the chamber 1103; and the elastic element 1131 is further stretched, and a gap 1106 is formed between the first interface 1101 and the second interface 1102, thereby breaking away from the sealed state. Therefore, the internal pressure of the chamber 1103 may be relieved through the gap 1106.

An elastic force generated when the elastic element 1131 is stretched is used to lock the first component 111 and the second component 112, and allow the first interface 1101 and the second interface 1102 to break away from the sealed state. Since the elastic element 1131 is always in a stretched state, thus the deformation direction of the elastic element 1131 is relatively fixed, and there is almost no bending deformation or torsion deformation. Therefore, there is no need to arrange the foregoing connecting rod 1133 to guide the deformation direction.

In some embodiments of the present application, the first interface 1101 and/or the second interface 1102 may be slightly deformed. For example, the first interface 1101 and/or the second interface 1102 is a surface of a sealing material (for example, a rubber surface), thereby increasing the sealing performance between the first interface 1101 and the second interface 1102.

In the above embodiments in which the elastic element 1131 is adopted to lock the first component 111 and the second component 112, the elastic element 1131 abuts against a surface opposite to the first interface 1101 on the first component 111, or abuts against a surface opposite to the second interface 1102 on the second component 112. In some other embodiments, the elastic element 1131 may also be arranged between the first interface 1101 and the second interface 1102. An initial state of the elastic element 1131 is a compressed state; when the internal pressure of the chamber 1103 exceeds the preset value, the first component 111 or the second component 112 may open under the joint action of the internal pressure of the chamber 1103 and the elastic force of the elastic element 1131, so that the first interface 1101 and the second interface 1102 break away from the sealed state.

In some embodiments of the present application, sealing and connection are achieved by a sealing member between the first interface 1101 and the second interface 1102. Exemplarily, as shown in FIG. 26, the box of the battery further includes a sealing member 114, and the sealing member 114 is arranged between the first component 111 and the second component 112, so that the first interface 1101 and the second interface 1102 are sealed and connected.

In some embodiments, a thickness of the sealing member 114 may be 3-8 mm. For example, the thickness of the sealing member 114 may be 4-5 mm. It should be understood that the thickness of the sealing member mentioned here refers to the thickness of the sealing member in a non-working state (that is, a natural state).

Figure 26:
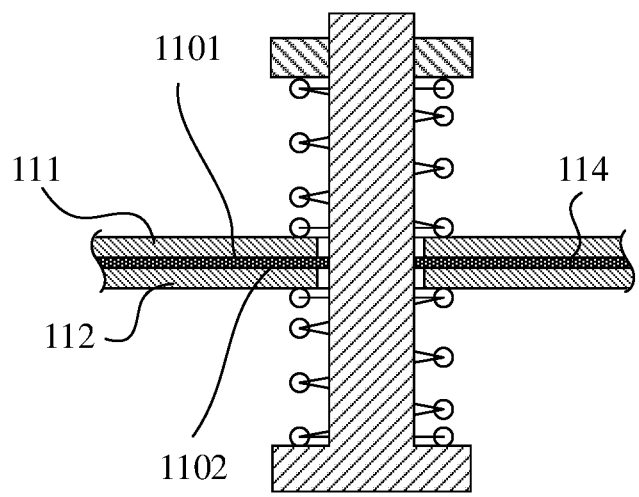
FIG. 26 is a schematic structural diagram of a box of a battery according to an embodiment of the present application.

It should be understood that the structure shown in FIG. 26 is only an exemplary illustration. In each of the above embodiments described in FIG. 6 to FIG. 25 and each of embodiments that will be introduced below, a sealing member 114 may be arranged between the first component 111 and the second component 112, which will not be described in detail here one by one for brevity.

In each of the above embodiments, the first component 111 and the second component 112 are locked by the first locking mechanism 113, specifically, adopting the elastic force generated by the elastic element 1131 in the compressed state to lock, or adopting the elastic force generated by the elastic element 1131 in the stretched state to lock.

Thus, in each of the above embodiments, the first locking mechanism 113 may be further configured to recover the first interface 1101 and the second interface 1102 to the sealed state, when the internal pressure of the chamber 1103 is relieved to smaller than or equal to the preset value.

Taking the structure shown in FIG. 25 as an example, when the internal pressure of the chamber 1103 exceeds the preset value, the first component 111 and the second component 112 move in the direction away from each other (for example, the direction indicated by the black arrow shown in the figure) under the joint action of the internal pressure and the elastic element 1131; and the first interface 1101 and the second interface 1102 break away from the sealed state for pressure relief. After having been relieved for a period of time, the internal pressure of the chamber 1103 decreases; when the internal pressure of the chamber 1103 is smaller than or equal to the preset value, the first component 111 and the second component 112 move in a direction approaching each other (for example, the opposite direction indicated by the black arrow shown in the figure) under the joint action of the internal pressure and the elastic element 1131; and the first interface 1101 and the second interface 1102 may recover to the sealed state.

The preset value mentioned in the embodiment of the present application may be understood as the preload applied by the elastic element 1131 on the first component 111 and the second component 112. Specifically, when the internal pressure of the chamber 1103 exceeds the preload of the elastic element 1131, the first component 111 and the second component 112 are separated under the internal pressure of the chamber 1103, and the first interface 1101 and the second interface 1102 break away from the sealed state. When the internal pressure of the chamber 1103 is smaller than the preload of the elastic element 1131, the first component 111 and the second component 112 adhere under the preload of the elastic element 1131, and the first interface 1101 and the second interface 1102 recover to the sealed state.

In this way, the first interface 1101 and the second interface 1102 break away from the sealed state for pressure relief, when the internal pressure of the chamber 1103 is excessively high. After the pressure relief, the sealed state may be recovered to seal the chamber 1103. The battery inside the chamber 1103 may continue to work in a sealed environment, to support a device that uses a battery to continue to operate. Taking an electric vehicle as an example, if the battery cell explodes, the emissions from the battery cell, such as high-pressure gases generated by the explosion, may be discharged through the gap 1106 between the first interface 1101 and the second interface 1102, to relieve the internal pressure of the chamber 1103. When the pressure is relieved below the preset value, the first interface 1101 and the second interface 1102 are recovered to the sealed state, and other unexploded battery cells may continue to work in the sealed environment, to extend the driving time of the electric vehicle and allow the driver to park the car to the side of the road or drive to a garage, to reduce the potential safety hazards caused by battery failure.

Figure 27:
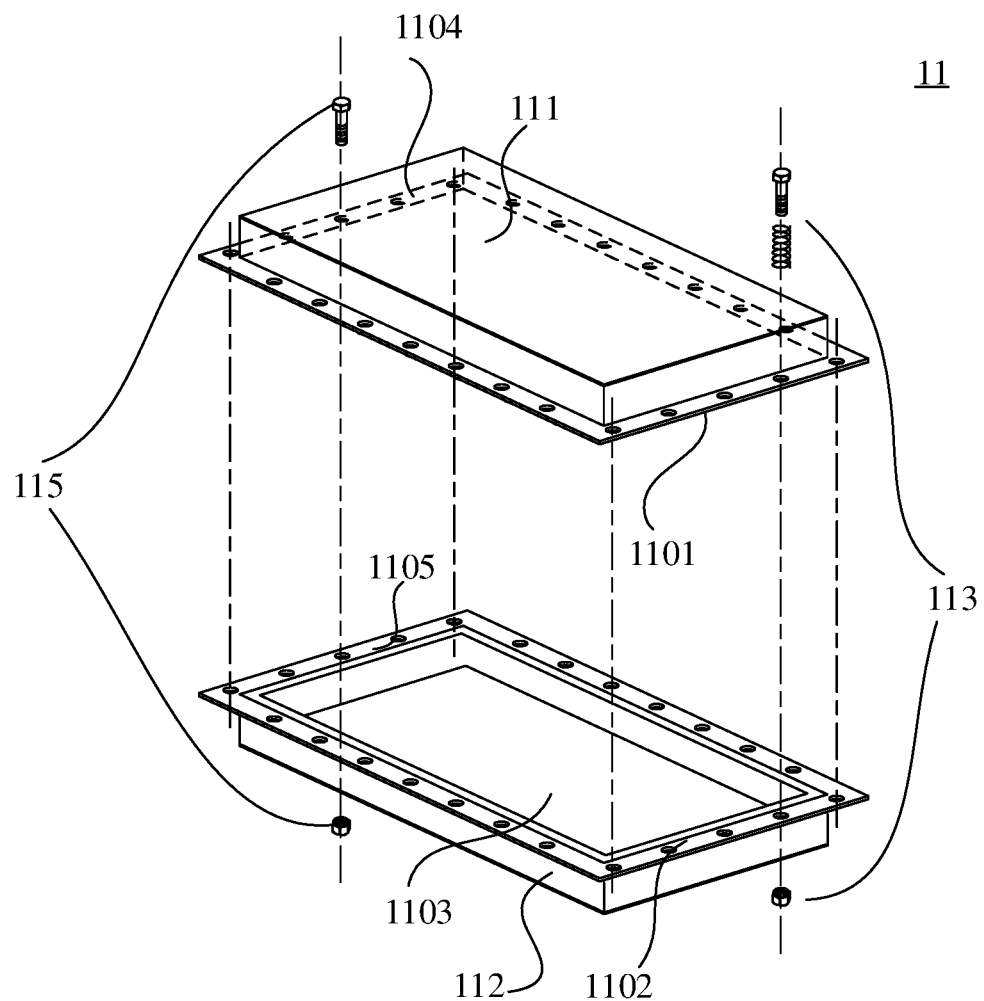
FIG. 27 is an exploded schematic structural diagram of a box of a battery according to an embodiment of the present application.

As shown in FIG. 27, it is an exploded schematic structural diagram of a box of a battery according to another embodiment of the present application. The box 11 includes a first component 111 and a second component 112, and the second component 112 is configured to connect with the first component 111 to form a chamber 1103. The chamber 1103 may be configured to accommodate the above plurality of battery cells 20. The first component 111 includes a first interface 1101 and a third interface 1104. The second component 112 includes a second interface 1102 and a fourth interface 1105, wherein the second interface 1102 is configured to be arranged opposite to the first interface 1101, and the fourth interface 1105 is configured to be arranged opposite to the third interface 1104.

In an embodiment of the present application, the first interface 1101 is arranged opposite to the second interface 1102, and the first interface 1101 may contact with or adhere to the second interface 1102. The fourth interface 1105 is configured to be arranged opposite to the third interface 1104, and the fourth interface 1105 may contact with or adhere to the third interface 1104. For convenience of display, the first component 111 and the second component 112 are separated in the figure, but it should be understood that the chamber 1103 is formed by fastening the first component 111 and the second component 112.

Continuing to refer to FIG. 27, the box 11 further includes a first locking mechanism 113 and a second locking mechanism 115. The first locking mechanism 113 is configured to lock the first component 111 and the second component 112, so that the first interface 1101 and the second interface 1102 are sealed and connected. The second locking mechanism 115 is configured to lock the first component 111 and the second component 112, so that the third interface 1104 and the fourth interface 1105 are sealed and connected. Among that, the first locking mechanism 113 is configured to be actuated when an internal pressure of the chamber 1103 exceeds a preset value, so that the first interface 1101 and the second interface 1102 break away from a sealed state to relieve the internal pressure of the chamber 1103. The third interface 1104 and the fourth interface 1105 maintain in a sealed state, when the internal pressure of the chamber 1103 exceeds the preset value, so that the internal pressure of the chamber 1103 is relieved through a gap between the first interface 1101 and the second interface 1102 that break away from the sealed state.

In the embodiment of the present application, the first interface 1101 and the third interface 1104 are continuous, or the first interface 1101 and the third interface 1104 are on a same surface of the first component 111, but a portion of the surface is the first interface 1101, and a portion is the third interface 1104.

Similarly, the second interface 1102 and the fourth interface 1105 are continuous, or the second interface 1102 and the fourth interface 1105 are on a same surface of the second component 112, but a portion of the surface is the second interface 1102, and a portion is the fourth interface 1105.

In some embodiments of the present application, when the first locking mechanism 113 and the second locking mechanism 115 lock the first component 111 and the second component 112, the first interface 1101 and the second interface 1102 are in the sealed state, and the third interface 1104 and the fourth interface 1105 are in the sealed state. When the internal pressure of the chamber 1103 exceeds the preset value, the third interface 1104 and the fourth interface 1105 maintain in the sealed state, and the first locking mechanism 113 is actuated to make the first interface 1101 and the second interface 1102 break away from the sealed state. In this way, the internal pressure of the chamber 1103 may be relieved through the gap formed after the first interface 1101 and the second interface 1102 break away from the sealed state, thereby reducing the safety risks caused by the increase in the internal pressure of the chamber 1103, and achieving directional pressure relief.

Specifically, when a battery cell occurs a thermal runaway, the emissions from the battery cell enter the chamber 1103. Since the chamber 1103 is sealed under the joint action of the first locking mechanism 113 and the second locking mechanism 115, which leads to the continuous accumulation of the emissions in the chamber 1103. When the pressure in the chamber 1103 exceeds the preset value, the sealing interface locked by the first locking mechanism 113 is expanded, and the chamber 1103 communicates with the outside. The emissions from the battery cells accumulated in the chamber 1103 may be relieved through the first locking mechanism 113 instead of the second locking mechanism 115, thereby achieving directional pressure relief.

In the case of thermal runaway occurring in a battery cell, the directional pressure relief may reduce airflow exchanges in and out of the chamber 1103, so that the emissions from the battery cell always flows from the inside of the chamber 1103 to the outside, reducing or avoiding the entry of outside air, such as oxygen, into the chamber 1103, so as to avoid further safety problems.

In some embodiments, a preload (for the convenience of description, referred to a first preload below) applied by the first locking mechanism 113 on the first component 111 or the second component 112 is smaller than a preload (for the convenience of description, referred to a second preload below) applied by the second locking mechanism 115 on the first component 111 or the second component 112. The above preset value may be equal to the first preload.

By setting the preloads of the first locking mechanism 113 and the second locking mechanism 115, the internal pressure of the chamber 1103 may be discharged through a position with a smaller preload, thereby achieving directional pressure relief.

Specifically, when the preloads applied by the first locking mechanism 113 and the second locking mechanism 115 are different; and when the internal pressure of the chamber 1103 exceeds the first preload, the first interface 1101 and the second interface 1102 locked by the first locking mechanism 113 first break away from the sealed state, to achieve pressure relief. If the internal pressure of the chamber 1103 does not exceed the second preload, the third interface 1104 and the fourth interface 1105 locked by the second locking mechanism 115 maintain in the sealed state. If the internal pressure of the chamber 1103 exceeds the second preload, the third interface 1104 and the fourth interface 1105 locked by the second locking mechanism 115 may also break away from the sealed state, to achieve further pressure relief.

In some embodiments of the present application, the first locking mechanism 113 and the second locking mechanism 115 may adopt the first locking mechanism 113 described in any one of the above embodiments in FIG. 6 to FIG. 26, wherein the first preload corresponding to the first locking mechanism 113 is smaller than the second preload corresponding to the second locking mechanism 115. The relevant description above may be referred to for the specific structure, which will not be described in detail here for brevity. In the above embodiments, the first locking mechanism 113 may also be referred to as an "elastic locking mechanism" in the case that an elastic element is used to lock the first component and the second component.

Figure 28:
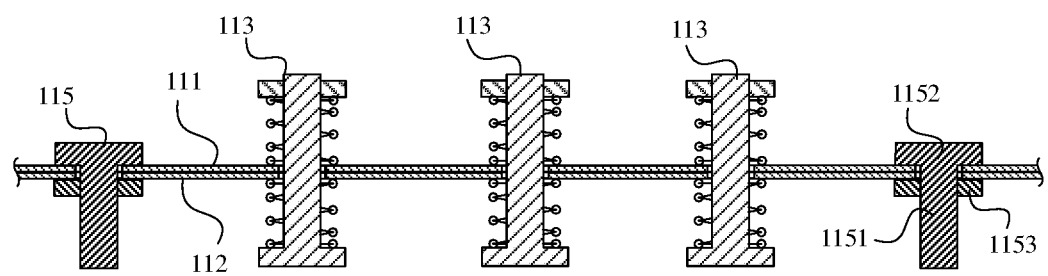
FIG. 28 is a schematic structural diagram of a box of a battery according to another embodiment of the present application.

In some embodiments, as shown in FIG. 28, the first locking mechanism 113 may adopt the first locking mechanism 113 described in any of the above embodiments in FIG. 6 to FIG. 26, the second locking mechanism 115 may adopt common bolt locking, and the first preload is smaller than the second preload.

Exemplarily, referring to FIG. 28, the second locking mechanism 115 may include a screw 1151, nuts 1152 and 1153, wherein the nut 1152 may be a fixed nut, which is fixed to one end of the screw 1151 to form a capped screw, and the nut 1153 is a movable nut. Or the nuts 1152 and 1153 are both movable nuts.

It should be understood that, in FIG. 28, take only the second locking mechanism 115 that is bolt locking as an example for description. In some other embodiments, the second locking mechanism 115 may adopt other fixed connection structures or detachable structures, etc., to lock the first component 111 and the second component 121, which is not limited in the embodiment of the present application.

In some embodiments, in the case that the first locking mechanism 113 adopts an elastic locking mechanism, and the second locking mechanism 115 adopts common bolt locking, a spacing between two adjacent first locking mechanisms 113 is 60 mm-245 mm. In some embodiments, the spacing between two adjacent first locking mechanisms 113 may be 60 mm-145 mm.

As an example and not limitation, the spacing between two adjacent first locking mechanisms 113 may be 60 mm, 70 mm, 80 mm, 95 mm, 120 mm, 145 mm, 180 mm, 215 mm, 230 mm, 245 mm, etc.

In some embodiments, the first locking mechanism 113 and the second locking mechanism 115 may both be common bolt locking; and for example, both are the second locking mechanisms 115 shown in FIG. 28, wherein the first preload is smaller than the second preload.

Figure 29:
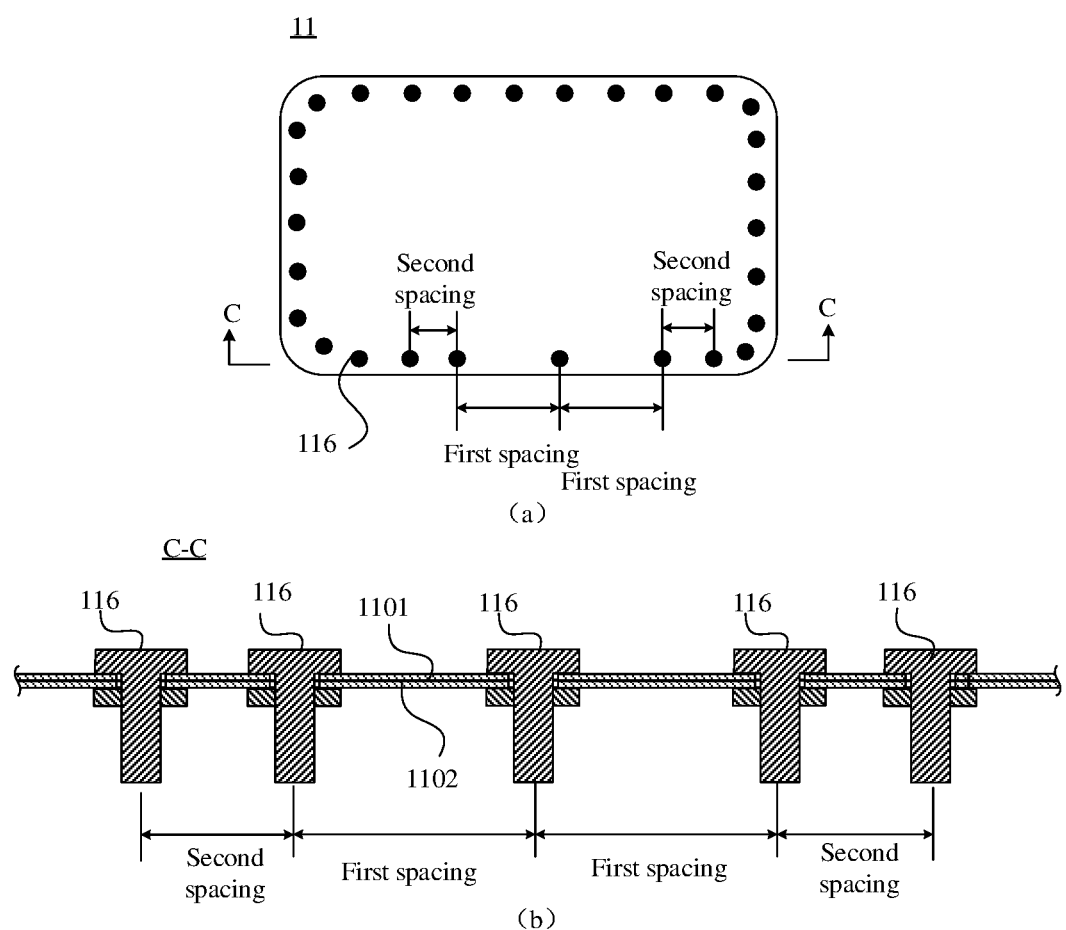
FIG. 29 is a schematic structural diagram of a box of a battery according to another embodiment of the present application.

As shown in FIG. 29, it is a schematic diagram of a box of the battery according to another embodiment of the present application, wherein (a) in FIG. 29 shows a schematic top view of the box of the battery, and (b) in FIG. 29 shows a schematic partial cross-sectional view taken along a line C-C in (a) in FIG. 29.

Referring to FIG. 29, the box 11 includes a plurality of the first locking mechanisms 116, and a spacing between the plurality of the first locking mechanisms 116 includes a first spacing and a second spacing, wherein the first spacing is greater than the second spacing, so as to allow a portion corresponding to the first spacing on the first interface 1101 and the second interface 1102 to break away from the sealed state for pressure relief, when the internal pressure of the chamber 1103 exceeds a preset value.

By setting the spacing between the first locking mechanisms 116, the internal pressure of the chamber 1103 may be discharged through a position with a larger spacing, thereby achieving directional pressure relief.

It should be understood that the portion corresponding to the first spacing on the first interface 1101 and the second interface 1102 may be understood as a portion of the sealing interface formed by the first interface 1101 and the second interface 1102.

In other words, the plurality of first locking mechanisms 116 seal and connect the first interface 1101 and the second interface 1102 to form a sealing interface, wherein the sealing interface includes a portion corresponding to the first spacing and a portion corresponding to the second spacing. When the internal pressure of the chamber 1103 exceeds the preset value, the sealing interface corresponding to the first spacing first break away the sealed state to achieve pressure relief. Of course, when the internal pressure of the chamber 1103 further increases to a certain threshold, the sealing interface corresponding to the second spacing may also break away from the sealed state, to further relieve the pressure.

For facilitate understanding, FIG. 29 only takes the first locking mechanism 116 as common bolt locking as an example for illustration. It may be understood that, in the embodiment of the present application, the first locking mechanism 116 may adopt the first locking mechanism 113 described in the above embodiments, that is, the first locking mechanisms 116 may be all elastic locking mechanisms. The first locking mechanism 116 may also be the second locking mechanism 115 described in the above embodiments, that is, the first locking mechanisms 116 may be all common bolt locking. Or the first locking mechanisms 116 partly adopt the first locking mechanism 113 described in the above embodiments, and partly adopt the second locking mechanism 115 described in the above embodiments, which is not limited in the embodiment of the present application.

The above embodiments introduce the manner of achieving directional pressure relief by setting the preloads of the first locking mechanism 113 and the second locking mechanism 115 as different, and the manner of achieving directional pressure relief by setting the spacing between the first locking mechanisms 116 as different. It should be understood that those skilled in the art may also consider two aspects of preload setting and spacing setting to achieve directional pressure relief, which is will not be repeated here for brevity.

Figure 30:
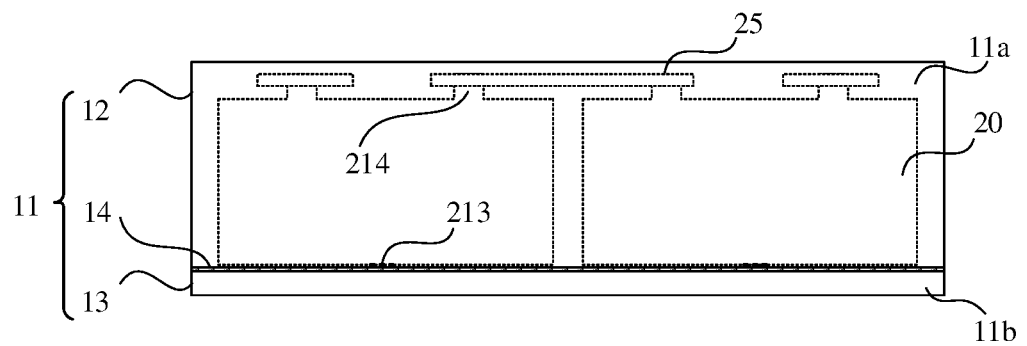
FIG. 30-FIG. 34 are schematic structural diagrams of a box of a battery according to some embodiments of the present application.

FIG. 30 is a schematic structural diagram of a box of a battery according to an embodiment of the present application. As shown in FIG. 30, the box 11 includes a first portion 12, a second portion 13 and an isolation component 14. The first portion 12 and the second portion 13 are formed with an accommodating space, and the accommodating space includes an electrical chamber 11a and a collection chamber 11b separated by the isolation component 14. The so-called "isolation" here refers to separation, which may not be sealed.

The electrical chamber 11a is configured to accommodate a plurality of the battery cells 20.

In some embodiments, the electrical chamber 11a is also configured to accommodate a bus component 25. The bus component 25 is configured to electrically connect the plurality of battery cells 20. The bus component 25 may implement the electrical connection between the battery cells 20 by connecting electrode terminals 214 of the battery cells 20.

The electrical chamber 11a provides an accommodation space for the battery cells 20 and the bus component 25, and the electrical chamber 11a may be shaped according to the plurality of battery cells 20 and the bus component 25.

At least one battery cell 20 of the plurality of battery cells 20 includes a pressure relief mechanism 213. The pressure relief mechanism 213 is configured to be actuated to relieve an internal pressure, when the internal pressure or temperature of the battery cell 20 provided with the pressure relief mechanism 213 reaches a threshold.

For convenience of description, the battery cell 20 referred to in the following description of the pressure relief mechanism 213 refers to the battery cell 20 provided with the pressure relief mechanism 213. For example, the battery cell 20 may be the battery cell 20 in FIG. 5.

The collection chamber 11b is configured to collect the emissions from the battery cell 20 provided with the pressure relief mechanism 213 when the pressure relief mechanism 213 is actuated.

The isolation component 14 is configured to isolate the electrical chamber 11a from the collection chamber 11b.

In the embodiment of the present application, the isolation component 14 is adopted to isolate the electrical chamber 11a from the collection chamber 11b. That is, the electrical chamber 11a that accommodates the plurality of battery cells 20 and the bus component 25 is separated from the collection chamber 11b that collects the emissions. In this way, when the pressure relief mechanism 213 is actuated, the emissions from the battery cells 20 enter the collection chamber 11b rather than the electrical chamber 11a, or a small amount of emissions enter the electrical chamber 11a, so that the electrical connection in the electrical chamber 11a is not affected, and therefore the safety of the battery may be enhanced.

In some embodiments, the isolation component 14 includes a wall shared by the electrical chamber 11a and the collection chamber 11b. As shown in FIG. 30, the isolation component 14 may be both a wall of the electrical chamber 11a and a wall of the collection chamber 11b. That is, the isolation component 14 (or a portion thereof) may be directly used as a wall shared by the electrical chamber 11a and the collection chamber 11b. In this way, the emissions from the battery cells 20 may enter the collection chamber 11b through the isolation component 14. Besides, since the existence of the isolation component 14, the emissions may be isolated from the electrical chamber 11a as far as possible, thus reducing the risk resulting from the emissions and enhancing the safety of the battery.

In the present application, the first component 111 and the second component 112 mentioned in each of the above embodiments may be any two of the first portion 12, the second portion 13 and the isolation component 14. When the first portion 12 or the second portion 13 is formed by a plurality of sub-portions, the first component 111 and the second component 112 may also be any two sub-portions that form sealing and connection among the plurality of sub-portions. A detailed description will be given below with reference to the accompanying drawings.

Figure 31:
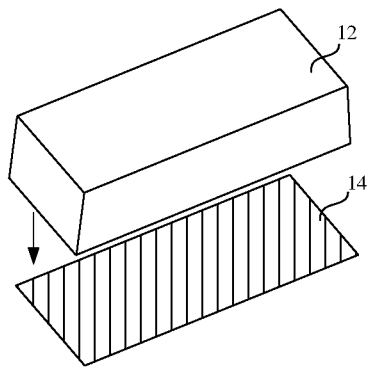

In some embodiments, the first component 111 is the first portion 12, and the second component 112 is the isolation component 14. For example, as shown in FIG. 31, the first portion 12 may be a covering including an opening (an opening on the lower side in FIG. 31). The covering with the opening is a semi-closed chamber with an opening in communication with the outside, and the isolation component 14 covers the opening to form the electrical chamber 11a.

In some embodiments, the first portion 12 may be a one-piece covering.

Figure 32:
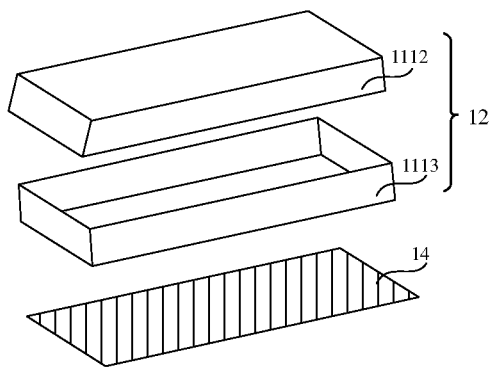

In some embodiments, the first portion 12 may be formed by a plurality of portions. For example, as shown in FIG. 32, the first portion 12 may include a first sub-portion 1112 and a second sub-portion 1113. Two sides of the second sub-portion 1113 including openings, respectively. The first sub-portion 1112 covers an opening on one side of the second sub-portion 1113, and the isolation component 14 covers an opening on the other side of the second sub-portion 1113, thus forming the electrical chamber 11a.

The embodiment of FIG. 32 may be obtained through improvements on the basis of FIG. 2. Specifically, a bottom wall of the second component 112 in FIG. 2 may be replaced with the isolation component 14, and the isolation component 14 acts as a wall of the electrical chamber 11a, thus forming the electrical chamber 11a. In other words, the bottom wall of the second component 112 in FIG. 2 may be removed. That is, an annular wall with opening on two sides is formed, and the first component 111 and the isolation component 14 cover the openings on the two sides of the second component 112 respectively to form the electrical chamber 11a.

Therefore, in some embodiments, the first component 111 and the second component 112 in the above embodiments may also be the first sub-portion 1112 and the second sub-portion 1113 of the first portion 12, respectively.

Figure 33:
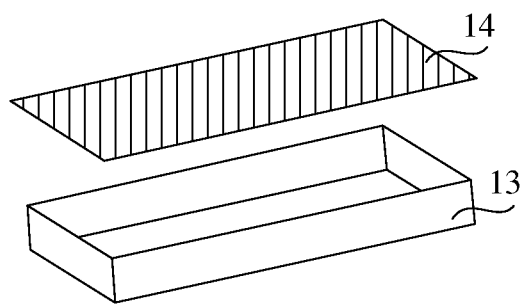

In some embodiments, the first component 111 is the isolation component 14 and the second component 112 is the second portion 13. For example, as shown in FIG. 33, the second portion 13 may be a covering including an opening (an opening on the upper side in FIG. 33). The covering with the opening is a semi-closed chamber with an opening in communication with the outside, and the isolation component 14 covers the opening to form the collection chamber 11b.

In some embodiments, the second portion 13 may be a protective member. The protective member is configured to protect the isolation component 14, and the protective member and the isolation component 14 form the collection chamber 11b.

The collection chamber 11b formed by the protective member and the isolation component 14 does not occupy the space that may accommodate the battery cells. Therefore, the collection chamber 11b with a larger space therein may be arranged, which may effectively collect and buffer the emissions and reduce the risk resulting therefrom.

In some embodiments, a fluid, such as a cooling medium, may be further arranged in the collection chamber 11b, or a component for accommodating the fluid may be provided to further cool the emissions entering the collection chamber 11b.

In some embodiments of the present application, the isolation component 14 may be a thermal management component, configured to accommodate a fluid to adjust the temperature of a plurality of battery cells 20. In the case of lowering the temperature of the battery cells 20, the thermal management component may accommodate a cooling medium to adjust the temperature of the plurality of battery cells 20. In this case, the thermal management component may also be called a cooling component, a cooling system or a cooling plate, etc. In addition, the thermal management component may also be used for heating, which is not limited by the embodiments of the present application. In some embodiments the fluid may flow in a circulating manner to achieve better temperature adjustment effects.

Figure 34:
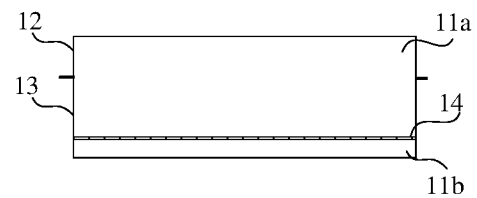

In some embodiments, the first component 111 is the first portion 12 and the second component 112 is the second portion 13. As shown in FIG. 34, a side of the second portion 13 includes an opening to form a semi-closed structure. The semi-closed structure is a chamber with an opening. The isolation component 14 is arranged inside the second portion 13, and the first portion 12 covers the opening of the second portion 13. That is, the isolation component 14 may be arranged in the semi-closed second portion 13 to isolate the collection chamber 11b, and then the first portion 12 covers the opening of the second portion 13 to form the electrical chamber 11a. The first portion 12 and the second portion 13 are sealed and connected.

In the embodiment of the present application, when the pressure relief mechanism 213 on the battery cell is actuated, the pressure relief mechanism 213 is opened to discharge the emissions in the battery cell 20. The emissions may pass through the isolation component 14, and enter the collection chamber 11b. Thus, the collection chamber 11b may have a large amount of the emissions from the battery cells. If the chamber sealed by the first component 111 and the second component 112 is a collection chamber, the emissions from the battery cells collected in the collection chamber, such as high-pressure and high-temperature gases, etc., may be discharged through the interface locked by the first locking mechanism to relieve pressure quickly and enhance the safety of the battery.

Figure 35:
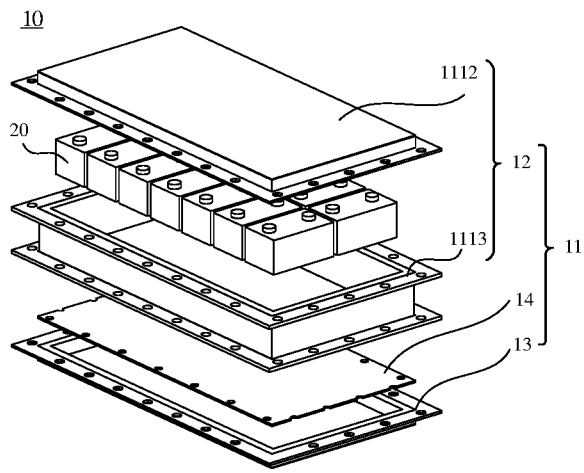
FIG. 35 is an exploded view of a battery according to an embodiment of the present application.

FIG. 35 is an exploded schematic view of a battery according to an embodiment of the present application. The battery 10 may include a box 11, a plurality of battery cells 20; and the box 11 is configured to accommodate the plurality of battery cells 20. The box 11 is the box 11 described in each of the foregoing embodiments.

For the description of each component in the battery 10, reference may be made to the foregoing embodiments, which will not be repeated here for brevity.

An embodiment of the present application further provides a power consumption device, and the power consumption device may include the battery 10 in each of the foregoing embodiments. In some embodiments, the power consumption device may be a vehicle 1, a ship or a spacecraft.

The box of a battery, the battery and the power consumption device according to the embodiments of the present application are described above, and a method and device for producing a battery according to the embodiments of the present application will be described below. For the parts not described in detail, reference may be made to the foregoing embodiments.

Figure 36:
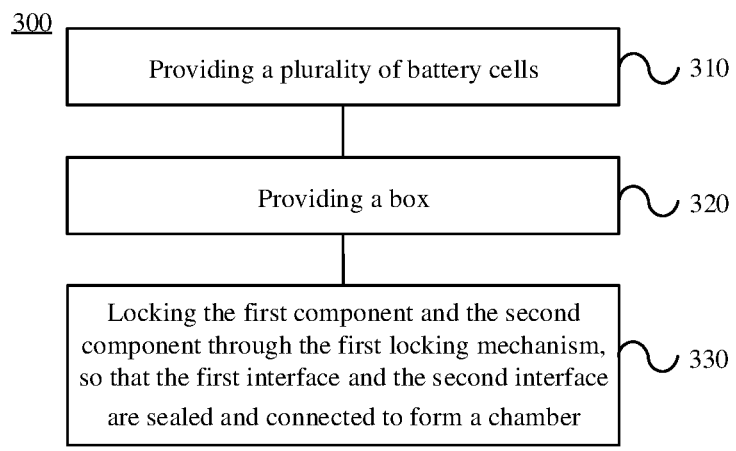
FIG. 36 is a schematic flowchart of a method for producing a battery according to an embodiment of the present application.

FIG. 36 shows a schematic flowchart of a method 300 for producing a battery according to an embodiment of the present application. As shown in FIG. 36, the method 300 may include:

310, providing a plurality of battery cells 20.

320, providing a box 11, the box 11 is configured to accommodate the plurality of battery cells 20. The box 11 includes: a first component 111, including a first interface 1101; a second component 112, including a second interface 1102, and the second interface 1102 is arranged opposite to the first interface 1101; and a first locking mechanism 113 is configured to lock the first component 111 and a second component 112. The embodiment of the present application does not limit the execution order of steps 320 and 310, and step 310 and step 320 may be executed sequentially or simultaneously. Therefore, here the order of step 320 and step 310 may be exchanged here.

330, locking the first component 111 and the second component 112 through the first locking mechanism 113, so that the first interface 1101 and the second interface 1102 are sealed and connected to form a chamber 1103, wherein the first locking mechanism 113 is actuated when the internal pressure of the chamber 1103 exceeds a preset value, so that the first interface 1101 and the second interface 1102 break away from the sealed state to relieve the internal pressure of the chamber 1103.

Figure 37:
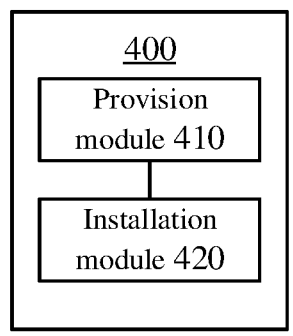
FIG. 37 is a schematic block diagram of a device for producing a battery according to an embodiment of the present application.

FIG. 37 shows a schematic block diagram of a device 400 for producing a battery according to an embodiment of the present application. As shown in FIG. 37, the device 400 for producing the battery may include: a provision module 410 and an installation module 420.

A provision module 410, is configured to: provide a plurality of battery cells 20; provide a box 11, the box 11 configured to accommodate the plurality of battery cells 20. The box 11 includes: a first component 111, including a first interface 1101; a second component 112, including a second interface 1102, the second interface 1102 being configured to be arranged opposite to the first interface 1101; and a first locking mechanism 113, configured to lock the first component 111 and a second component 112.

The installation module 420, is configured to lock the first component 111 and the second component 112 through the first locking mechanism 113, so that the first interface 1101 and the second interface 1102 are sealed and connected to form a chamber 1103, wherein the first locking mechanism 113 is actuated when the internal pressure of the chamber 1103 exceeds a preset value, so that the first interface 1101 and the second interface 1102 break away from the sealed state to relieve the internal pressure of the chamber 1103.

Although the present application has been described with reference to the preferred embodiments, various modifications may be made to it without departing from the scope of the present application and the components therein may be replaced with equivalents. In particular, as long as there is no structural conflict, the various technical features mentioned in the various embodiments may be combined in any manner. The present application is not limited to the specific embodiments disclosed in the text, but includes all technical solutions falling within the scope of the claims.

What is claimed is:

1. A box of a battery, comprising:
   a first component, comprising a first interface;
   a second component, configured to connect with the first component to form a chamber, the second component comprising a second interface, the second interface being configured to be arranged opposite to the first interface;

a first locking mechanism, configured to lock the first component and the second component, so that the first interface and the second interface are sealed and connected;

wherein, the first locking mechanism is configured to be actuated when an internal pressure of the chamber exceeds a preset value, so that the first interface and the second interface break away from a sealed state to relieve the internal pressure of the chamber;

wherein the first locking mechanism comprises an elastic element, and the elastic element is configured to generate elastic deformation when the internal pressure of the chamber exceeds the preset value, so that the first interface and the second interface break away from the sealed state;

wherein the first locking mechanism further comprises a supporting member, one end of the elastic element is configured to abut against one of the first component or the second component, and the other end of the elastic element is configured to abut against the supporting member, to allow the first component or the second component to move relative to the supporting member, when the internal pressure of the chamber exceeds the preset value;

wherein the first component comprises a third interface;

the second component comprises a fourth interface, and the fourth interface is configured to be arranged opposite to the third interface;

the box further comprises:

a second locking mechanism, configured to lock the first component and the second component, so that the third interface and the fourth interface are sealed and connected;

wherein the third interface and the fourth interface maintain in a sealed state, when the internal pressure of the chamber exceeds the preset value, so that the internal pressure of the chamber is relieved through a gap between the first interface and the second interface that break away from the sealed state;

wherein the second locking mechanism comprises a screw, a first nut and a second nut, wherein the first nut is located on a side of the third interface away from the fourth interface and is fixed to one end of the screw, and the second nut is located on a side of the fourth interface away from the third interface;

wherein a first preload applied by the first locking mechanism on the first component or the second component is smaller than a second preload applied by the second locking mechanism on the first component or the second component.

2. The box according to claim 1, wherein the first locking mechanism further comprises a connecting rod, and one end of the connecting rod is configured to be attached to a same component with the elastic element;

the supporting member is provided with a guide hole, and the other end of the connecting rod is configured to pass through the guide hole, so that the connecting rod moves along an extending direction of the guide hole, when the elastic element is elastically deformed.

3. The box according to claim 2, wherein the elastic element is configured to be sleeved on the connecting rod.

4. The box according to claim 1, wherein one end of the supporting member is configured to abut against the elastic element, and the other end of the supporting member is configured to be attached to the other one of the first component and the second component.

5. The box according to claim 1, wherein
the first component is provided with a first through hole;
the first locking mechanism further comprises: a connecting rod, one end of the connecting rod is configured to be attached to the second component, and the other end of the connecting rod is configured to pass through the first through hole to be attached to the supporting member;
one end of the elastic element is configured to abut against the first component, and the other end of the elastic element is configured to abut against the supporting member.

6. The box according to claim 5, wherein the second component is provided with a second through hole, and the connecting rod is configured to pass through the first through hole and the second through hole, to connect the first component and the second component.

7. The box according to claim 6, wherein the supporting member comprises a first supporting member and a second supporting member;
one end of the connecting rod is configured to be attached to the first supporting member, the other end of the connecting rod is configured to be attached to the second supporting member, and the second supporting member is configured to abut against the second component;
one end of the elastic element is configured to abut against the first component, and the other end of the elastic element is configured to abut against the first supporting member; or
wherein the supporting member comprises a first supporting member and a second supporting member;
the elastic element comprises a first elastic element and a second elastic element; wherein,
one end of the connecting rod is configured to be attached to the first supporting member, and the other end of the connecting rod is configured to be attached to the second supporting member;
one end of the first elastic element is configured to abut against the first component, and the other end of the first elastic element is configured to abut against the first supporting member;
one end of the second elastic element is configured to abut against the second component, and the other end of the second elastic element is configured to abut against the second supporting member.

8. The box according to claim 1, wherein the first locking mechanism further comprises a first abutment member, the elastic element abuts against the first component through the first abutment member, wherein an area where the first abutment member contacts with the first component is larger than an area where the first abutment member contacts with the elastic element; and/or,
the first locking mechanism further comprises a second abutment member, and the elastic element abuts against the second component through the second abutment member, wherein an area where the second abutment member contacts with the second component is larger than an area where the second abutment member contacts with the elastic element.

9. The box according to claim 1, wherein at least one abutment surface for abutting against the elastic element is provided with a restraint part, and the restraint part is configured to restrain movement of the elastic element perpendicular to an elasticity direction of the elastic element.

10. The box according to claim 9, wherein the restraint part comprises a recess, and the recess is configured to house an end of the elastic element corresponding to the restraint part; or wherein the restraint part comprises a protrusion, wherein an end of the elastic element corresponding to the restraint part is sleeved on the protrusion.

11. The box according to claim 1, wherein the box further comprises a sealing member, and the sealing member is arranged between the first component and the second component, so that the first interface and the second interface are sealed and connected.

12. The box according to claim 1, wherein one end of the elastic element is configured to be attached to the first component, the other end of the elastic element is configured to be attached to the second component, and the elastic element is configured to be always in a stretched state when the first interface and the second interface maintain in the sealed state and break away from the sealed state.

13. The box according to claim 1, wherein the first locking mechanism is further configured to recover the first interface and the second interface to the sealed state, when the internal pressure of the chamber is relieved to smaller than or equal to the preset value.

14. The box according to claim 1, wherein the box comprises a first portion, a second portion and an isolation component;

the first portion and the second portion are formed with an accommodating space, and the accommodating space comprises an electrical chamber and a collection chamber separated by the isolation component; wherein, the electrical chamber is configured to accommodate a plurality of battery cells, at least one battery cell of the plurality of battery cells comprises a pressure relief mechanism, and the pressure relief mechanism is configured to be actuated to relieve an internal pressure, when the internal pressure or temperature of the battery cell provided with the pressure relief mechanism reaches a threshold;

the collection chamber is configured to collect emissions from the battery cell provided with the pressure relief mechanism when the pressure relief mechanism is actuated;

the first component and the second component are any two of the first portion, the second portion and the isolation component.

15. A battery, comprising:

a plurality of battery cells; and the box according to claim 1, and the box is configured to accommodate the plurality of battery cells.

16. A power consumption device, comprising: the battery according to claim 15.

* * * * *